United States Patent [19]
Kyodo

[11] Patent Number: 5,796,231
[45] Date of Patent: Aug. 18, 1998

[54] ROTATION POSITION DETECTING DEVICE AND MOTOR DEVICE

[75] Inventor: Yasumasa Kyodo, Tokyo, Japan

[73] Assignee: Sony Corporation, Japan

[21] Appl. No.: 660,105

[22] Filed: Jun. 7, 1996

[30] Foreign Application Priority Data

Jun. 8, 1995 [JP] Japan .................. 7-141926

[51] Int. Cl.$^6$ .................................. G05B 1/02
[52] U.S. Cl. ................ 318/608; 318/611; 318/623; 318/652; 318/809; 388/812
[58] Field of Search ............... 318/652, 687, 318/632, 661, 653, 807, 254, 611, 810, 809, 721, 723, 607, 608, 600, 606, 602, 603; 388/805, 812, 820

[56] References Cited

U.S. PATENT DOCUMENTS

| | | | |
|---|---|---|---|
| 4,952,860 | 8/1990 | Soeda | 318/721 |
| 5,300,873 | 4/1994 | Otani et al. | 318/880 |
| 5,378,976 | 1/1995 | Inaji et al. | 318/810 |
| 5,399,952 | 3/1995 | Alem et al. | 318/652 |
| 5,493,188 | 2/1996 | Yoshikawa et al. | 318/254 |
| 5,565,722 | 10/1996 | Rubner et al. | 310/90.5 |
| 5,565,752 | 10/1996 | Jansen et al. | 318/807 |

*Primary Examiner*—John W. Cabeca
*Attorney, Agent, or Firm*—Ronald P. Kananen

[57] ABSTRACT

A rotation position detecting circuit for a sensor-less motor and a motor device include a motor (1) which is rotated and driven by adding a sensor signal having a high frequency to a sine wave drive signal and cosine wave drive signal through adders (5S) and (5C), respectively. Further, a sensor signal is extracted and demodulated from a signal flowing in the motor (1) by a band pass filer (9), and this is defined as a rotation position detection signal. In the sensor signal from the band pass filter (9), its current value is changed corresponding to a change of an impedance resulting from a rotation of a magnet of the motor. As a result, it is possible to detect the rotation position of a rotor magnet by detecting the change of the current value.

18 Claims, 20 Drawing Sheets

FIG.4A SENSOR SIGNAL ADDED TO DRIVE SIGNAL
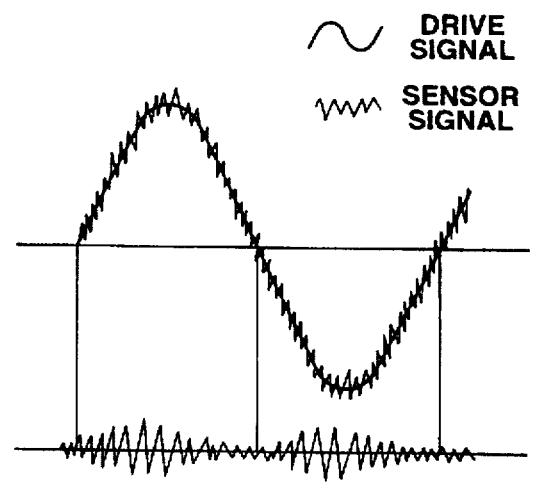
FIG.4B DETECTED SENSOR SIGNAL
FIG.4C ROTATION POSITION DETECTION SIGNAL FOR FIRST PHASE
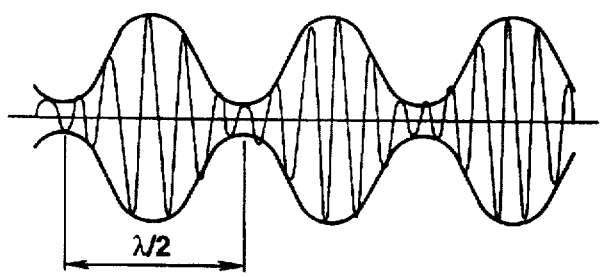
FIG.4D ENCODER PULSE FOR FIRST PHASE
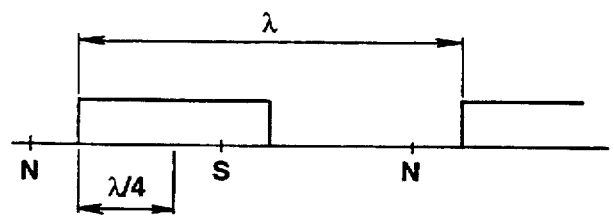
FIG.4E ENCODER PULSE FOR SECOND PHASE
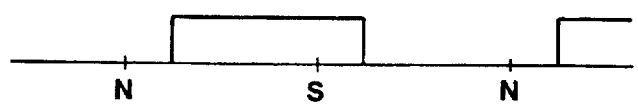

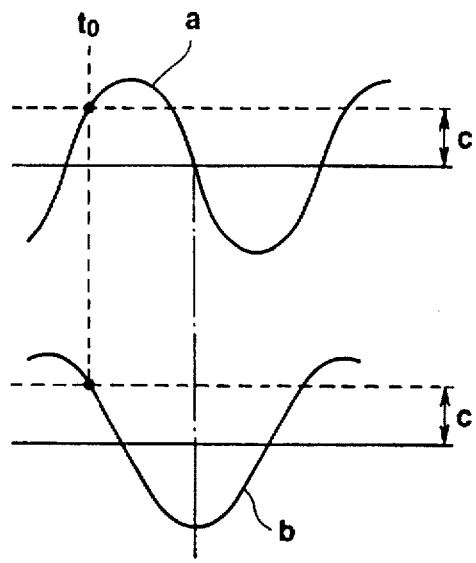
FIG.21A
FIG.21B
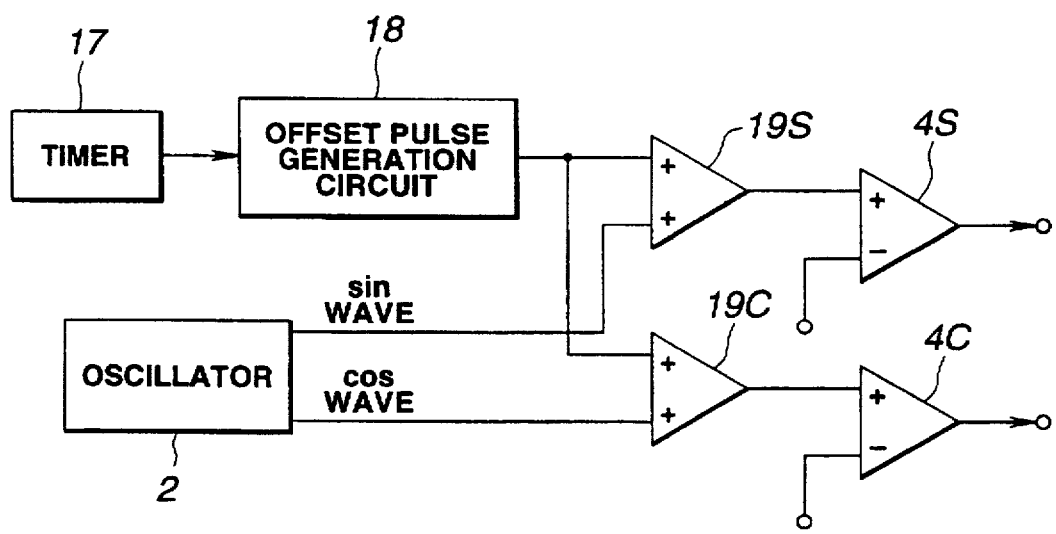
FIG.22

FIG.23A 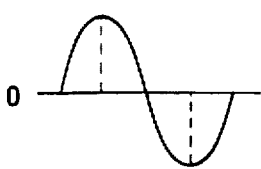 FIG.23C 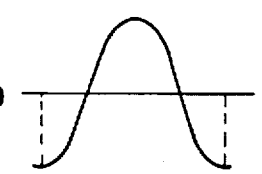
FIG.23B  FIG.23D 
FIG.24A 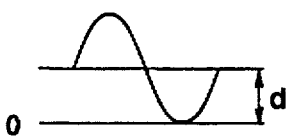 FIG.24C 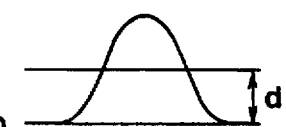
FIG.24B 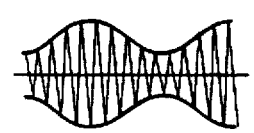 FIG.24D 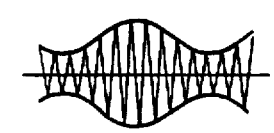
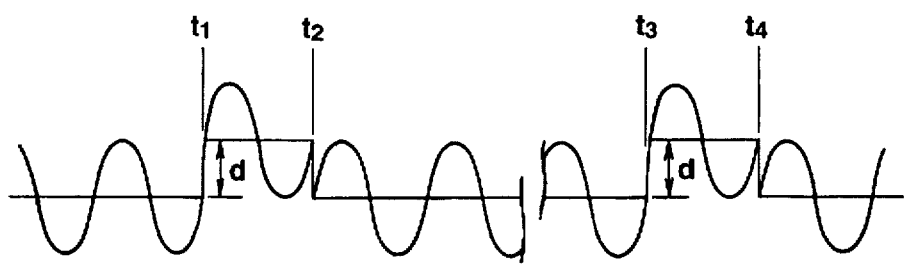
FIG.25

ROTATION POSITION DETECTING DEVICE AND MOTOR DEVICE

BACKGROUND OF THE INVENTION

1. Field of the Invention

The present invention relates to a rotation position detecting device for detecting a rotation position of a rotor of a so-called brush-less motor, and a motor device including this rotation position detecting device.

2. Description of the Prior Art

Recently, a brush-less motor is used in various electronic apparatuses, such as a standard type of a reproducing dedicated disk, a portable type of a video tape recorder and the like.

This brush-less motor uses an electrical switch to switch a conducting timing to each of phases and drive a synchronous motor, although a D.C. motor switches the conducting timing to each of the phases. It is necessary to switch this conducting timing such that an operation is carried out at the maximum power factor. However, in a case of a permanent magnet type of a synchronous motor, its timing is simply determined from a position of a magnetic pole of a permanent magnet (a rotor magnet) mounted in a rotator. For this reason, the brush-less motor requires to detect a magnetic pole position (a rotation position) and switch the conducting timing to each of the phases. For this reason, the brush-less motor has a rotation detecting element, such as a Hall element, a magnetic resistance effect element and the like. And, the rotation position of the rotor is detected by this rotation detecting element, and thereby the switching of the conducting timing to each of the phases are carried out on the basis of this detected result.

However, if mounting the above mentioned rotation detecting element, a cost becomes expensive, and a transmission line is needed for transmitting a detection signal from the rotation detecting element to a rotation controlling system. This results in a problem that a motor itself becomes larger.

For this reason, a rotation position detecting device is developed which enables a sensor-less drive. This rotation position detecting device detects a back electro-motive voltage generated in each of phases of a brush-less motor, and sends this detected output to a motor drive circuit.

That is, in the motor, the phase except the conducting phase acts as a generator, and this generates the back electro-motive voltage. Thus, it is possible to detect the rotation position of the rotor by detecting the back electro-motive voltage. The motor drive circuit detects the rotation position of the rotor based on the detected output of the back electro-motive voltage, and switches the conducting timing to each of the phases corresponding to this detected result. Accordingly, the motor can detect the rotation position of the rotor and switch the conducting timing to each of the phases without mounting the rotation detecting element such as the Hall element and the like. Thus, the rotation detecting element such as the Hall element and the like can be omitted, which can make the motor itself smaller and a cost thereof cheaper.

Incidentally, in the brush-less motor having no conventional sensor, at a time of starting the motor or in a case of a slow speed rotation, the back electro-motive voltage is not generated. Or even if generated, its level is small. Thus, the conventional rotation position detecting device can not detect the rotation position of the rotor, at the time of starting the motor or in the case of the slow speed rotation. Further, kick back noise induced at a time of switching the conducting timing to each of the phases, and the like are largely added to the back electro-motive voltage. This results in a problem of an obstacle against an accurate rotation position detection.

For this reason, the brush-less motor which detects the rotation position by using this back electro-motive voltage can not be used for a servo control in which it is necessary to accurately detect the rotation position. Further, in a case that the brush-less motor is used for the servo control, the rotation detecting element must be mounted in order to accurately detect the rotation position. Finally, this results in inconvenience that the motor itself is made larger, and other demerits.

SUMMARY OF THE INVENTION

The present invention is directed to a rotation position detecting circuit for a sensor-less motor and a motor device that overcomes the deficiencies of the prior art as described above. In particular, a rotation position detecting circuit for a sensor-less motor and a motor device of the present invention include a motor which is rotated and driven by adding a sensor signal having a high frequency to a sine wave drive signal and cosine wave drive signal through respective adders. The sensor signal is extracted and demodulated from a signal flowing in the motor by a band pass filer, and this signal is defined as a rotation position detection signal. The current value of the sensor signal from the band pass filter is changed corresponding to a change of an impedance resulting from the rotation of a motor magnet. As a result, it is possible to detect the rotation position of a rotor magnet by detecting the change of the current value.

The rotation position detecting device in accordance with the present invention can provide a perfectly new sensor-less driving method and can detect a rotation position accurately and surely at a time of starting a motor or even in case of a slow speed rotation. Further, since the rotation position can be detected accurately and surely, a motor can be used for a servo control without mounting a rotation detection element. As a result, it is possible to make a motor smaller and a cost thereof cheaper by reducing the part number and making a mounted area smaller. Further, a motor device in accordance with the present invention can carry out a rotation and drive in synchronization with reference, without basically modifying inner construction for all brush-less motors, since using a sensor-less method which perfectly solves defects of a back electromotive voltage method.

Further objects and advantages of the present invention will be apparent from the following description of the preferred embodiments of the invention as illustrated in the accompanying drawings.

BRIEF DESCRIPTION OF THE DRAWINGS

FIG. 4, consisting of FIGS. 4A–4E, is a wave form view explaining an operation of the rotation position detecting device and a generating operation of an encoder pulse of the first embodiment.

FIG. 21 is a view explaining a point at which drive currents in respective phases of a motor become equal to each other.

FIG. 22 is a block diagram showing a schematic configuration of a portion in which an offset signal is added to a drive signal.

FIG. 23, consisting of FIGS. 23A–23D, is a view showing drive signals and sensor signals in respective phases of a two-phase construction motor.

FIG. 24, consisting of FIGS. 24A–24D, is a view showing drive signals and sensor signals, in respective phases of a two-phase construction motor, to which offset signals are added.

FIG. 25 is a view showing a signal obtained by adding an offset signal on a drive signal.

DESCRIPTION OF THE PREFERRED EMBODIMENTS

Embodiments of a rotation position detecting device in accordance with the present invention and a motor device using the rotation position detecting device will be explained hereinafter in detail with reference to the drawings.

Figure 1:
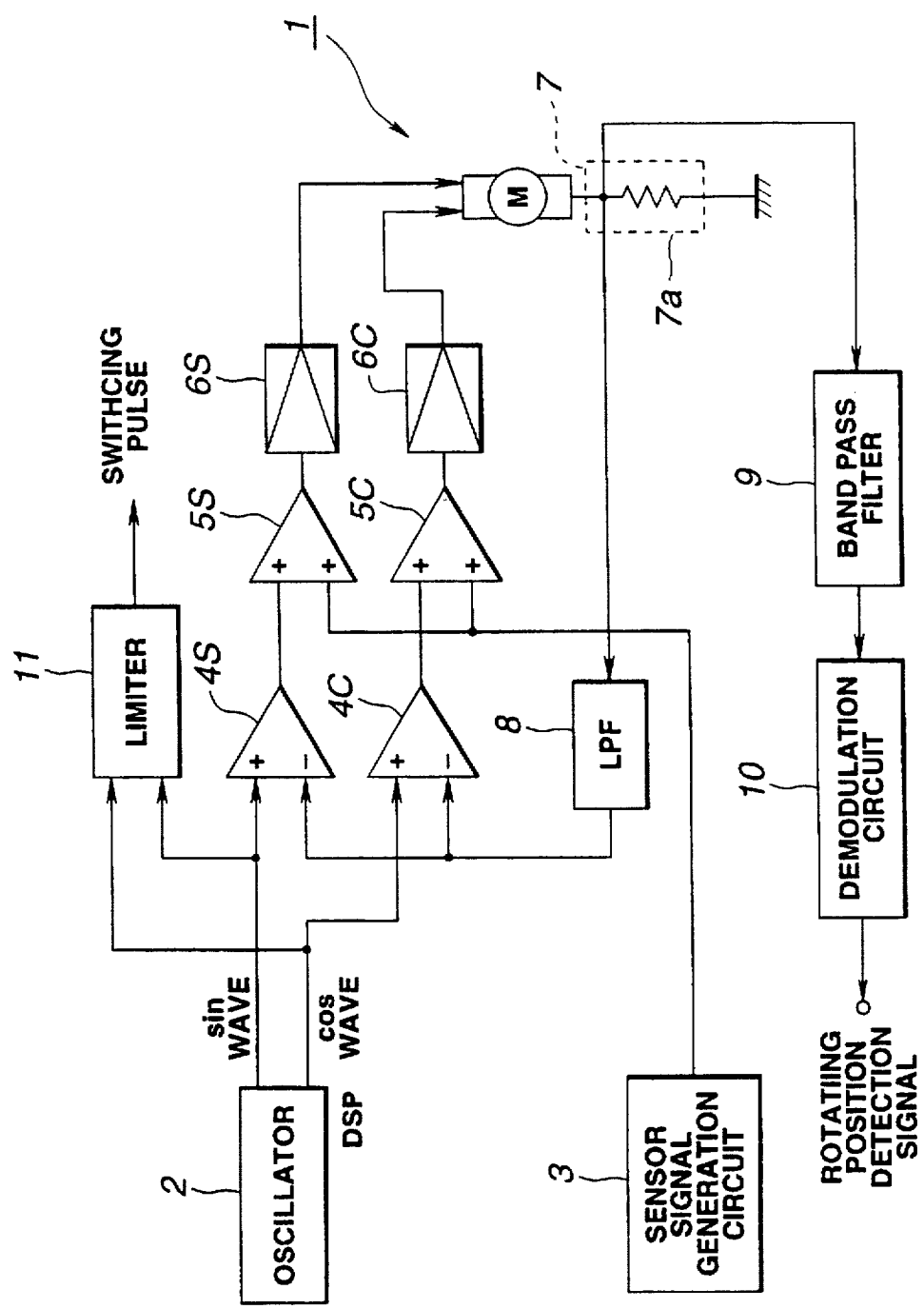
FIG. 1 is a block diagram showing a schematic configuration of a rotation position detecting device of a first embodiment in accordance with the present invention.

FIG. 1 shows a schematic configuration of a rotation position detecting device as a first embodiment in accordance with the present invention.

As shown in FIG. 1, the rotation position detecting device of the first embodiment in accordance with the present invention has, for example, an oscillator 2 and a sensor signal generating circuit 3. The oscillator 2 outputs a sine wave drive signal which is a constant current, and a cosine wave drive signal which is a constant current and is out of phase by 90 degrees from the sine wave drive signal, in order to send them to respective phases of a two-phase brush-less motor 1. The sensor signal generating circuit 3 outputs a sensor signal having a frequency several times the frequency of each of the drive signals. The oscillator 2 and the sensor signal generating circuit 3 are mounted in a so-called digital signal processor (DSP).

The rotation position detecting device has differential amplifiers 4S and 4C, adders 5S and 5C, and amplifiers 6S and 6C. The differential amplifiers 4S and 4C amplify and output differences between the respective drive signals and feed-backed present drive signals so as to drive under a constant current the brush-less motor 1. The adders 5S and 5C add the sensor signals from the sensor signal generating circuit 3 to the respective drive signals from the respective differential amplifiers 4S and 4C. The amplifiers 6S and 6C amplify, by a predetermined gain, the respective drive signals to which the sensor signals are added.

The rotation position detecting device has a drive signal detecting circuit 7 and a low pass filter (LPF) 8. The drive signal detecting circuit 7 detects the current values of the drive signals, which are presently sent to the respective phases of the brush-less motor 1, through a resistor 7a in a form of a voltage. The low pass filter (LPF) 8 removes the sensor signal with a high frequency from the drive signal detected by the drive signal detecting circuit 7, and feed-backs to each of the differential amplifiers 4S and 4C.

The rotation position detecting device has a band pass filter (BPF) 9, a demodulation circuit 10 and a limiter 11. The band pass filter (BPF) 9 extracts the sensor signal with the high frequency from the drive signal detected by the drive signal detecting circuit 7. The demodulation circuit 10 carries out a predetermined demodulation process to the sensor signal extracted by the BPF 9, and outputs it as a rotation position detection signal of the brush-less motor 1. The limiter 11 generates a switching pulse, based on each of the drive signals, and outputs it.

Then, a motor device can be constituted by sending the rotation position detection signal from the demodulation circuit 10 to a servo lock circuit and the like, and controlling a rotation phase of the motor corresponding to the rotation position detection signal.

Figure 2:
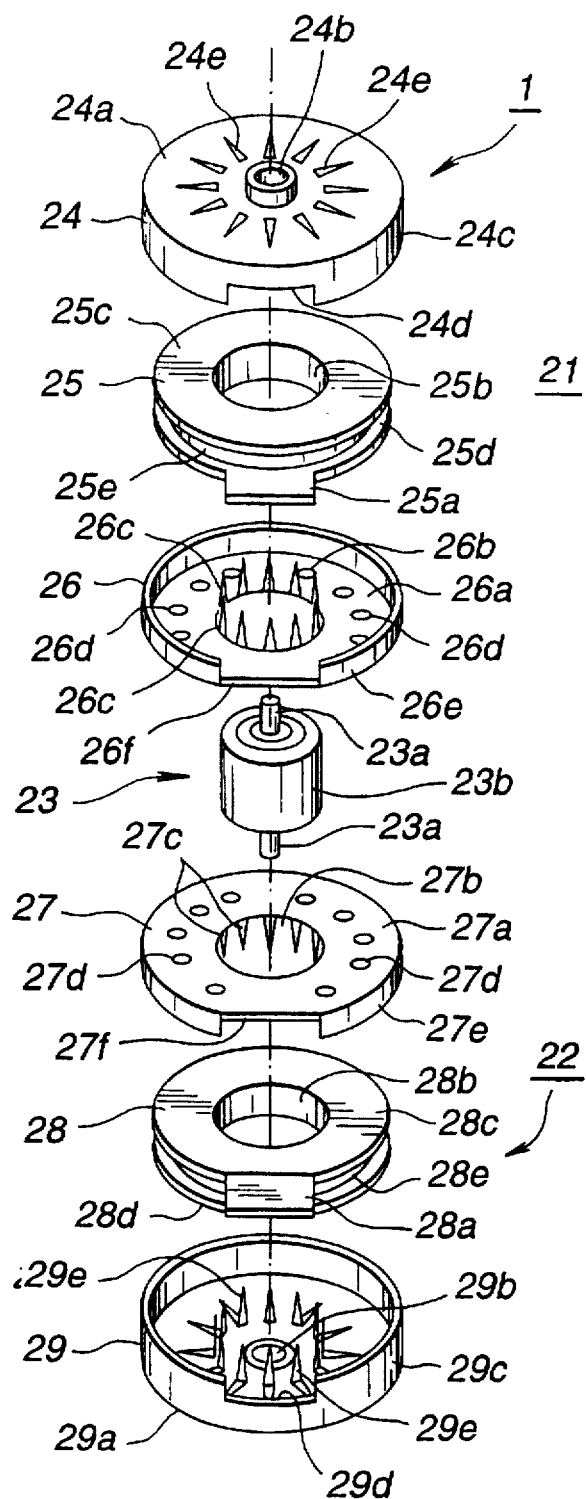
FIG. 2 is an exploded perspective view explaining a configuration of a brush-less motor connected to the rotation position detecting device of the first embodiment.

The brush-less motor 1 is a so-called stepping motor as shown in FIG. 2, and is composed of a first stator 21, a second stator 22 and a rotor magnet 23 which is rotatably arranged for the first and second stators 21 and 22.

The first stator 21 is composed of an upper yoke 24, a lower yoke 26 and a bobbin 25. The upper yoke 24 is cylindrical in shape. The lower yoke 26 is cylindrical in shape and has an outer diameter which is slightly smaller than an inner diameter of the yoke 24. The bobbin 25 is held in inner clearance generated when the lower yoke 26 is aligned with the upper yoke 24.

In the upper yoke 24, there is provided a support hole 24b for rotatably supporting a rotation shaft 23a of the rotor magnet 23 at a nearly central position of a top surface 24a of the upper yoke. On the top surface 24a of the upper yoke 24, for example, there are disposed twelve pole teeth 24e, which are isosceles-triangle-shaped, at same intervals, so as to surround the support hole 24b. The pole teeth 24e are stood down vertically to the top surface 24a, respectively. In detail, the pole teeth 24e are constituted such that the top surface 24a is cut away so as to form twelve notch pieces, which are isosceles-triangle-shaped and are arranged on a circle at the same intervals, and such that the respective notch pieces are bent so as to be stood down vertically to the top surface 24a. The respective pole teeth 24e are adapted to be inserted into a cylinder portion 25b of the bobbin 25, as described later, at the thus-bent state and to be abutted on an inner wall of the cylinder portion 25b. Further, an interval in which the respective pole teeth 24e are disposed is equal to a magnetizing interval for the rotor magnet 23 (for example, an interval of λ.)

In the upper yoke 24, there is provided a side portion 24c having a height so as to put the bobbin 25 between the upper yoke 24 and the lower yoke 26, when the upper yoke 24 is aligned with the lower yoke 26. In the side portion 24c, there is provided a notch piece 24d for guiding a projecting piece 25a disposed in the bobbin 25 outside the first stator 21.

The bobbin 25 is composed of a cylinder portion 25b in a form of a cylinder, an upper flange 25c and a lower flange 25d. The cylinder portion 25b has a diameter into which the rotor magnet 23 can be rotatably inserted. The upper flange 25c and the lower flange 25d have diameters which are slightly smaller than an inner diameter of the lower yoke 26, respectively. Aperture portions approximately identical to an inner diameter of the cylinder portion 25b are disposed in the upper flange 25c and the lower flange 25d, respectively. And, the upper flange 25c is disposed at one end plane of the cylinder portion 25b such that the aperture portion of the upper flange 25c and an opening of the cylinder portion 25b are in correspondence to each other. The lower flange 25d is disposed at the other end plane of the cylinder portion 25b such that the aperture portion of the lower flange 25d and the opening of the cylinder portion 25b are in correspondence to each other.

A coil 25e for a first phase is wrapped around an outer circumference of the cylinder portion 25b of the bobbin 25 having the above mentioned configuration. And, in the lower flange 25d, there is provided the projecting piece 25a for guiding an end portion of the coil 25e wrapped around the outer circumference of the cylinder portion 25b outside the first stator 21.

The lower yoke 26 is, as mentioned above, cylindrical in shape and has the outer shape which is slightly smaller than the inner diameter of the yoke 24. In a nearly central position of a bottom surface 26a of the lower yoke 26, there is provided an aperture portion 26b with a diameter into which the rotor magnet 23 can be rotatably inserted. In periphery of the aperture portion 26b, for example, there are disposed twelve pole teeth 26c, which are isosceles-triangle-shaped, at same intervals, so as to surround the aperture portion 26b, and which are stood up vertically to the bottom surface 26a, respectively. In detail, the pole teeth 26c are constituted such that an area abutted on the aperture portion 26b of the bottom surface 26a is cut away so as to form twelve notch pieces, which are isosceles-triangle-shaped, and such that the respective notch pieces are bent so as to be stood up vertically along the aperture portion 26b. The respective pole teeth 26c are adapted to be inserted into the cylinder portion 25b of the bobbin 25 at the thus-bent state and to be abutted on the inner wall of the cylinder portion 25b.

Further, the respective pole teeth 26c are disposed at the same interval λ as the respective pole teeth 24e disposed in the upper pole 24. Accordingly, an interval between the respective pole teeth 26c is equal to the magnetizing interval for the rotor magnet 23. In addition, the respective pole teeth 26c are disposed at positions such that the respective pole teeth 24e of the upper yoke 24 are located between the respective pole teeth 26c, that is, such that the respective pole teeth 24e of the upper yoke 24 are engaged with the respective pole teeth 26c of the lower yoke 26, when the upper yoke 24 is aligned with the lower yoke 26.

In the bottom surface 26a of the lower yoke 26, for example, there are provided ten connecting holes 26d at same intervals, so as to surround the aperture portion 26b, and there are fixed the first stator 21 and the second stator 22 described later by means of connecting pins through the connecting holes 26d. In addition, the lower yoke 26 has an outer circumference 26e which is slightly lower than the outer circumference 24c of the upper yoke 24. In the outer circumference 26e, there is provided a notch portion 26f for guiding the projecting piece 25a disposed in the lower flange 25d of the bobbin 25 outside the first stator 21.

In the first stator 21 having a configuration composed of the above mentioned respective portions 24, 25 and 26, a position of the notch portion 26f of the lower yoke 26 is aligned with that of the projecting piece 25a of the bobbin 25, and the bobbin 25 is placed on the lower yoke 26 such that the respective pole teeth 26c of the lower yoke 26 are inserted into the cylinder portion 25b of the bobbin 25. And, the position of the projecting piece 25a of the bobbin 25 is aligned with that of the notch piece 24d of the upper yoke 24, and then the upper yoke 24 is aligned with the lower yoke 24 such that the respective pole teeth 24e of the upper yoke 24 are inserted into the cylinder portion 25b of the bobbin 25. Accordingly, within the cylinder portion 25b of the bobbin 25, the respective pole teeth 24e of the upper yoke 24 and the respective pole teeth 26c of the lower yoke 26 are engaged with each other, alternatively. And, the bobbin 25 is put between the upper yoke 24 and the lower yoke 26 which are engaged with each other. The first stator 21 is formed in this way.

The second stator 22 has a configuration reverse to the above mentioned first stator 21, and is composed of an upper yoke 27, a lower yoke 29 and a bobbin 28. The upper yoke 27 is cylindrical in shape. The lower yoke 29 is cylindrical in shape and has an inner diameter which is slightly larger than an outer shape of the yoke 27. The bobbin 28 is held in inner clearance generated when the lower yoke 29 is aligned with the upper yoke 27.

The upper yoke 27, as mentioned above, is cylindrical in shape and has an outer shape which is slightly smaller than an inner diameter of the lower yoke 29. In a nearly central position of a top surface 27a of the upper yoke 27, there is provided an aperture portion 27b with a diameter into which the rotor magnet 23 can be rotatably inserted. Around periphery of the aperture portion 27b, for example, there are disposed twelve pole teeth 27c, which are isosceles-triangle-shaped, at same intervals, so as to surround the aperture portion 27b, and which are stood down vertically to the top surface 27a, respectively. In detail, the pole teeth 27c are constituted such that an area abutted on the aperture portion 27b of the top surface 27a is cut away so as to form twelve notch pieces, which are isosceles-triangle-shaped, and such that the respective notch pieces are bent so as to be stood down vertically along the aperture portion 27b. The respective pole teeth 27c are adapted to be inserted into the cylinder portion 28b of the bobbin 28 at the thus-bent state and to be abutted on an inner wall of the cylinder portion 28b. Further, the respective pole teeth 27c are disposed at the same interval λ as the magnetizing interval of the rotor magnet 23.

In the top surface 27a of the upper yoke 27, for example, there are provided ten connecting holes 27d at same intervals, so as to surround the aperture portion 27b, and there are fixed the first stator 21 and the second stator 22 by means of the connecting pins through the connecting holes 27d. In addition, the upper yoke 27 has an outer circumference 27e which is slightly lower than an outer circumference 29c of the lower yoke 29. In the outer circumference 27e, there is provided a notch portion 27f for guiding a projecting piece 28a disposed in an upper flange 28c of the bobbin 28 outside the second stator 21.

The bobbin 28 is composed of a cylinder portion 28b in a form of a cylinder, the upper flange 28c and a lower flange 28d. The cylinder portion 28b has a diameter into which the rotor magnet 23 can be rotatably inserted. The upper flange 28c and the lower flange 28d have diameters which are slightly smaller than an inner diameter of the upper yoke 27, respectively. Aperture portions approximately identical to an inner diameter of the cylinder portion 28b are disposed in the upper flange 28c and the lower flange 28d, respectively. And, the upper flange 28c is disposed at one end plane of the cylinder portion 28b such that the aperture portion of the upper flange 28c and an opening of the cylinder portion 28b are in correspondence to each other. The lower flange 28d is disposed at the other end plane of the cylinder portion 28b such that the aperture portion of the lower flange 28d and the opening of the cylinder portion 28b are in correspondence to each other.

A coil 28e for a second phase is wrapped around an outer circumference of the cylinder portion 28b of the bobbin 28 having the above mentioned configuration. And, in the upper flange 28c, there is provided the projecting piece 28a for guiding an end portion of the coil 28e wrapped around the outer circumference of the cylinder portion 28b outside the second stator 22.

In the lower yoke 29, there is a support hole 29b for rotatably supporting the rotation shaft 23a of the rotor magnet 23 at a nearly central position of a bottom surface 29a of the lower yoke 29. Further, in the bottom surface 29a of the lower yoke 29, for example, there are disposed twelve pole teeth 29e, which are isosceles-triangle-shaped, at same intervals, so as to surround the support hole 29b. The pole teeth 29e are stood down vertically to the bottom surface 29a, respectively. In detail, the pole teeth 29e are constituted such that the bottom surface 29a is cut away so as to form twelve notch pieces, which are isosceles-triangle-shaped and are arranged on a circle at the same intervals, and such that the respective notch pieces are bent so as to be stood down vertically to the bottom surface 29a. The respective pole teeth 29e are adapted to be inserted into the cylinder portion 28b of the bobbin 28, as described later, at the thus-bent state and to be abutted on the inner wall of the cylinder portion 28b. Further, an interval in which the respective pole teeth 29e are disposed is the interval λ equal to the magnetizing interval for the rotor magnet 23. In addition, the respective pole teeth 29e are disposed at positions such that the respective pole teeth 27c of the upper yoke 27 are located between the respective pole teeth 29e, that is, such that the respective pole teeth 27c of the upper yoke 27 are engaged with the respective pole teeth 29e of the lower yoke 29, when the upper yoke 27 is aligned with the lower yoke 29.

In the lower yoke 29, there is provided a side portion 29c having a height so as to put the bobbin 28 between the upper yoke 27 and the lower yoke 29, when the upper yoke 27 is aligned with the lower yoke 29. In the side portion 29c, there is provided a notch portion 29d for guiding the projecting piece 28a disposed in the bobbin 28 outside the second stator 22.

In the second stator 22 having a configuration composed of the above mentioned respective portions 27, 28 and 29, a position of the notch portion 29d of the lower yoke 29 is aligned with that of the projecting piece 28a of the bobbin 25, and the bobbin 28 is placed on the lower yoke 29 such that the respective pole teeth 29e of the lower yoke 29 are inserted into the cylinder portion 28b of the bobbin 28. And, the position of the projecting piece 28a of the bobbin 28 is aligned with that of the notch portion 27f of the upper yoke 24, and then the upper yoke 27 is aligned with the lower yoke 29 such that the respective pole teeth 27c of the upper yoke 27 are inserted into the cylinder portion 28b of the bobbin 28. Accordingly, within the cylinder portion 28b of the bobbin 28, the respective pole teeth 27c of the upper yoke 27 and the respective pole teeth 29e of the lower yoke 29 are engaged with each other, alternatively. And, the bobbin 28 is put between the upper yoke 27 and the lower yoke 29 which are engaged with each other. The second stator 22 is formed in this way.

Figure 3:
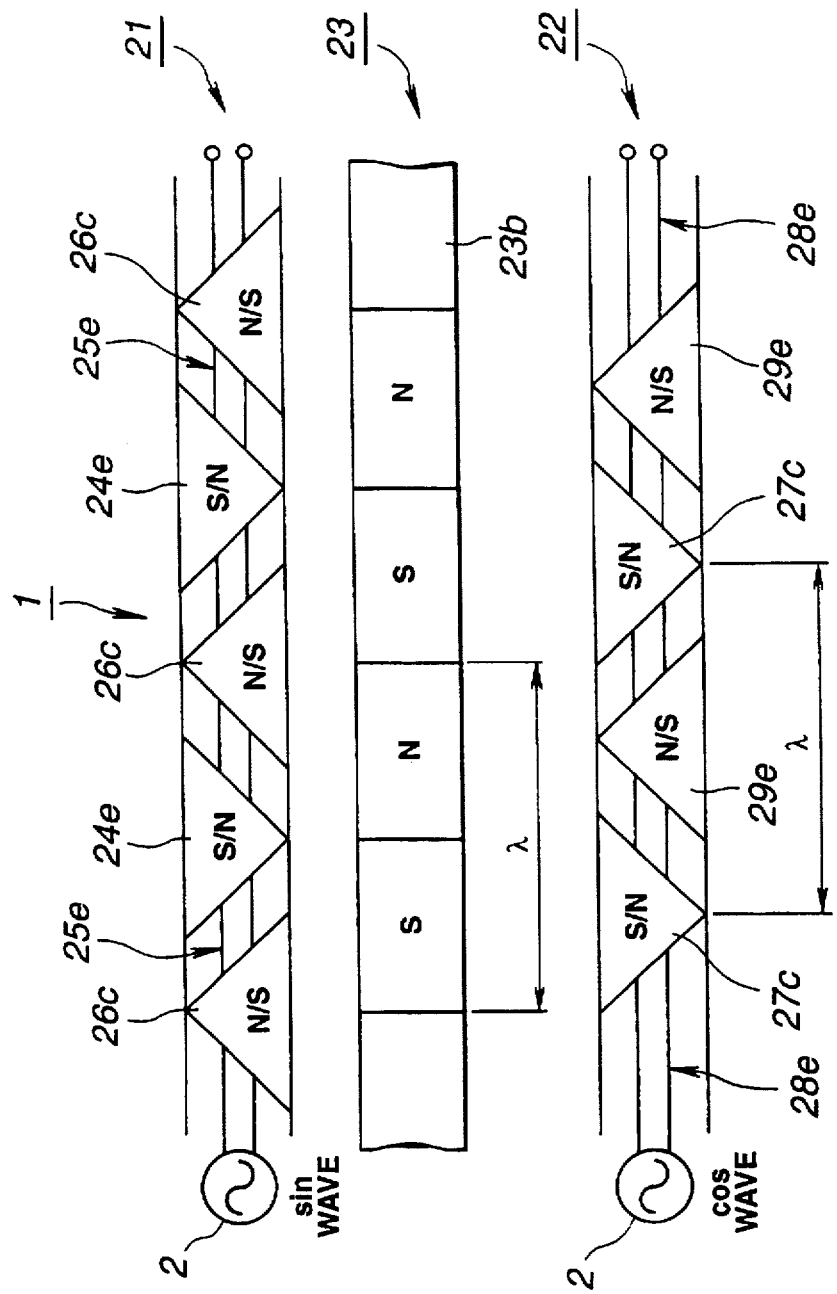
FIG. 3 is a view explaining an interval between pole teeth of the brush-less motor and a magnetizing interval of rotor magnets.

In the rotor magnet 23, the outer circumference 23b thereof is alternatively magnetized to a S pole and a N pole, as shown in FIG. 3. A magnetization length of each of the S pole and the N pole is $\lambda/2$. When combining a pole with a pole adjacent to the above mentioned S pole, the magnetization length becomes $\lambda$. As mentioned above, location intervals between the respective pole teeth 24e and 26c disposed respectively in the upper yoke 24 and the lower yoke 26 of the first stator 21 and between the respective pole teeth 27c and 29e disposed respectively in the upper yoke 27 and the lower yoke 29 of the second stator 22 are $\lambda$ equal to the magnetization length of the rotor magnet 23.

The brush-less motor 1 has the first and second stators 21 and 22 and the rotor magnet 23 as mentioned above, and is assembled as described below. That is, at first, one rotation shaft 23a of the rotor magnet 23 is inserted through the cylinder portion 28b of the bobbin 28 into the support hole 29b disposed in the lower yoke 29 of the second stator 22. Next, the first and second stators 21 and 22 are aligned with each other, so as to insert the other rotation shaft 23a of the rotor magnet 23 into the support hole 24b disposed in the upper yoke 24 through the cylinder portion 25b of the bobbin 25 of the first stator 21, at the above mentioned state. And, when the first and second stators 21 and 22 are aligned with each other, the respective stators 21 and 22 are fixed by means of the connecting pins through the connecting hole 26d disposed in the lower yoke 26 of the first stator 21 and the connecting hole 27d disposed in the upper yoke 27 of the second stator 22. The brush-less motor 1 is assembled in this way.

Perfect anti-magnetization process is carried out for each of the stators 21 and 22 so that magnetization generated at one stator is not leaked into the other stator. Further, it is designed that a first phase generated by wrapping the coil 25e around the bobbin 25 of the first stator 21 and a second phase generated by wrapping the coil 28e around the bobbin 28 of the second stator 22 are spaced from each other by $\lambda/4$, in a state that the brush-less motor 1 is assembled as mentioned above.

An operation of the position detecting device of the first embodiment in accordance with the present invention will be explained hereafter. At first, in FIG. 1, when it is specified to rotate and drive the brush-less motor 1, the oscillator 2 generates the sine wave drive signal and the cosine wave drive signal which are out of phase by 90 degrees from each other, and sends them to non-inverting input terminals (+) of the differential amplifiers 4S and 4C, respectively.

Since the respective twelve pole teeth are disposed in the respective yokes 24, 26, 27 and 29 in the respective stators 21 and 22 as mentioned above, a rotation angle $\lambda$ in one period of a drive current which is a pitch of the pole tooth is $\lambda=2\pi/12$ (rad). Further, in a case that the brush-less motor 1 is rotated at 2400 rpm, each speed $\Omega$ at this time is $\Omega=2\pi \cdot (2400/60)=80 \pi$ (rad/sec). Accordingly, in a case that the brush-less motor 1 is rotated and driven at 2400 rpm, a frequency f of each drive signal is $f=\Omega/\lambda=80 \pi/(2 \pi/12)=480$ (Hz). The sine wave drive signal and the cosine wave drive signal having the above mentioned frequencies of 480 Hz are sent to the non-inverting input terminals of the respective differential amplifiers 4S and 4C.

Although explained later, the drive signals which are presently sent to the brush-less motor 1 are feed-backed to the non-inverting input terminals (−) of the respective differential amplifiers 4S and 4C. For this reason, each of the differential amplifiers 4S and 4C detects the difference between the feed-backed present drive signal and the sine wave drive signal or the cosine wave drive signal, and outputs it to each of the adders 5S and 5C.

On the other hand, the sensor signal generating circuit 3 generates a sensor signal having a frequency several times the frequency of each of the drive signals, for example, a frequency of 10 KHz, and having a sufficiently small level for each of the drive signals, and sends it to each of the adders 5S and 5C. Although the frequency of the sensor signal is different based on the motor, it is desirable to set a frequency of a high frequency area of a capacitive component of a coil as an upper limit.

The adder 5S adds the sensor signal with a high frequency to the sine wave drive signal, and sends it to the brush-less motor 1 through the amplifier 6S. And, the adder 5C adds the sensor signal with the high; frequency to the cosine wave drive signal, and sends it to the brush-less motor 1 through the amplifier 6C. That is, a so-called driven component is added as a bias on each of the drive signals, which is sent to the brush-less motor 1.

Actually, as shown in FIG. 3, the sine wave drive signal to which the sensor signal is added is sent to the first stator 21. The cosine wave drive signal to which the sensor signal is added is sent to the second stator 22. Accordingly, each of the pole teeth 24e, 26c, 27c and 29e in each of the stators 21 and 22 becomes an electro-magnet, and is changed into the S pole or the N pole based on a level of the sent drive signal. In FIG. 3, S/N or N/S indicates a polarization change in each of the pole teeth 24e, 26c, 27c and 29e which is changed on the basis of the level of each of the drive signals.

As mentioned above, the respective drive signals sent to the first stator 21 and the second stator 22 are out of phase by 90 degrees from each other. The first phase generated by wrapping the coil 25e around the bobbin 25 of the first stator 21 and the second phase generated by wrapping the coil 28e around the bobbin 28 of the second stator 22 are spaced from each other by $\lambda/4$. For this reason, a synthetic magnetic field of a magnetic field of the first phase and a magnetic field of the second phase which are generated by sending the respective drive signals becomes a rotation field. Then, the rotor magnet 23 is rotated and driven since it is pulled by magnetic suction forces generated by the polarization changes of the respective pole teeth 24e, 26c, 27c and 29e.

The current value in each of the drive signals sent to the brush-less motor 1 is detected in a form of a voltage value through the resistor 7a of the drive signal detection circuit 7, and is feed-backed to the LPF 8. The LPF 8 removes the appropriate signal from each of the drive signals to which the sensor signals are added, and feed-backs it to each of the inverting input terminals (−) in each of the differential amplifiers 4S and 4C as the drive signal which is presently sent to the brush-less motor 1. Each of the differential amplifiers 4S and 4C detects the difference between the present drive signal feed-backed as mentioned above and the sine wave drive signal or the cosine wave drive signal and sends it to each of the adders 5S and 5C. Each of the adders 5S and 5C adds the sensor signal to each of the drive signals and sends it to the brush-less motor 1. The rotation position detecting device drives under a constant current the brush-less motor 1 by using such a phase locked loop configuration (PLL configuration).

A relation between the rotor magnet 23 and the sensor signals acting on the rotor magnet 23 through the respective pole teeth 24e, 26c, 27c and 29e will be explained. Incidentally, this relation is all identical in the respective yokes 24, 26, 27 and 29. Thus, only the relation between the rotor magnet 23 and the sensor signal acting on the rotor magnet 23 through the lower yoke 26 is explained, and the other explanations are omitted.

Figure 5A:
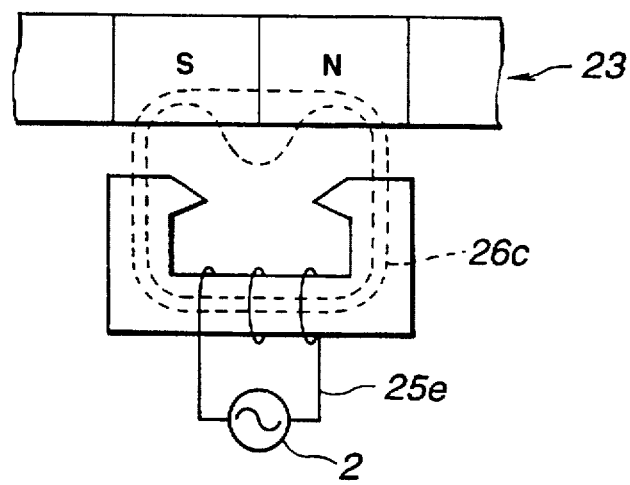
FIG. 5, consisting of FIGS. 5A and 5B, is a diagrammatical view explaining an impedance change of a sensor signal added to a drive signal of rotating and driving the brush-less motor.
Figure 5B:
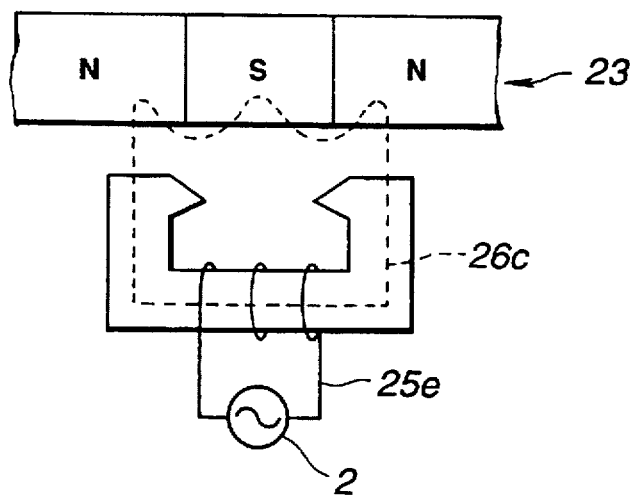

At first, the sensor signal which is added to the sine wave drive signal and sent to the first phase of the brush-less motor 1 as shown in FIG. 4(a) passes through a magnetic circuit generated between the rotor magnet 23 and the lower yoke 26 (a comb tooth yoke 26) having comb teeth 26 as shown in dashed lines of FIGS. 5(a) and 5(b), and makes an excursion between the rotor magnet 23 and the comb tooth yoke 26. When the rotor magnet 23 is rotated under this state, a magnetic resistance in the magnetic circuit is changed on the basis of the rotation of the rotor magnet 23, as shown in the dashed lines in FIGS. 5(a) and 5(b), and thereby electric impedance is changed periodically. And, the current value of the sensor signal is increased or decreased on the basis of the change of the impedance.

As mentioned above, the current value in each of the drive signals sent to the brush-less motor 1 is detected in the form of the voltage value through the resistor 7a in the drive signal detection circuit 7, feed-backed to the LPF 8, and also sent to the BPF 9. The BPF 9 removes the sine wave drive signal and the cosine wave drive signal from the drive signals sent from the drive signal detection circuit 7, and thereby extracts only the respective sensor signals added to the respective drive signals as shown in FIG. 4(b), and sends them to the demodulation circuit 10, respectively. The demodulation circuit 10 detects, demodulates and outputs envelop in each of the sensor signals, as shown in FIGS. 4(c) and 4(d).

As can be evident from the above mentioned explanations, the rotation position detecting device according to this embodiment can detect the rotation position of the rotor magnet 23 by detecting the respective sensor signals whose current values are changed on the basis of the change of the impedance resulting from the rotation of the rotor magnet 23. In each of the drive signals, the voltage level is changed due to a back electro-motive voltage offset action. However, the rotation position detecting device according to this embodiment carries out a constant current drive, and in addition extracts the sensor signal at the band pass filter 9. Thus, it is possible to detect the sensor signal without receiving an influence of the change of the drive signal and possible to accurately carry out the rotation position detection. And, when trying to detect the rotation position of the rotor magnet by using the back electro-motive voltage, at a time of starting the motor and in a case of a slow speed rotation, the back electro-motive voltage is not induced, or even if induced, a level thereof is small, and thereby it is not possible to detect the rotation position. However, the above sensor signal can be detected independent of the rotation speed of the brush-less motor 1. Thus, it is possible to detect the rotation position of the rotor magnet 23 accurately and surely even at the time of starting the motor and even in the case of the slow speed rotation. And, it is possible to rotate and drive a so-called stepping motor, as a servo motor having no sensor, without mounting a rotation detection element. Further, it is possible to fully correct a slowness of the maximum rotation speed and a high holding current and the like which are defects of the stepping motor.

If using the back electro-motive voltage, kick back noise or the like induced at a time of switching a conducting timing to each of the phases is added to the back electro-motive voltage, which results in an obstacle against an accurate rotation position detection. Then, in a case that a brush-less motor is used for a servo control process of requiring the accurate rotation position detection, in order to carry out the accurate rotation position detection, the rotation detection element must be provided finally, which results in such an inconvenience that the motor itself is made larger. However, the rotation position detecting device according to this embodiment can carry out the accurate rotation position detection without receiving the influence even if the level change is induced in the drive signal as mentioned above. As a result, it is possible to use the brush-less motor 1 for the servo control process without mounting the rotation detection element, and thereby this rotation position detecting device can contribute sufficiently to making the brush-less motor 1 smaller and a cost thereof cheaper by reducing the number of the parts and an installed area.

And, this rotation position detecting device can provide a perfectly new sensor-less driving method instead of a conventional sensor-less driving method of detecting the back electro-motive voltage.

Incidentally, in the above mentioned first embodiment, it is explained that the rotation position detecting device according to this embodiment is the constant current drive type. However, it is allowable to be a constant voltage drive type. Or, it is allowable to use the constant current drive type with the constant voltage drive type. In any of the drive types, the rotation position of the brush-less motor 1 can be detected as mentioned above, by adding the sensor signal, driving the brush-less motor 1 and detecting the appropriate sensor signal. Further, it is explained to detect the present drive signal through the drive signal detection circuit 7. However, it is allowable to extract the present drive signal from a coil voltage output terminal disposed in the brush-less motor 1.

A rotation position detecting device of a second embodiment in accordance with the present invention will be explained hereafter. This rotation position detecting device according to the second embodiment generates and outputs an encoder pulse which is a pulse of indicating a pole number of the brush-less motor 1, based on the rotation position detection signal from the demodulation circuit 10.

Figure 6:
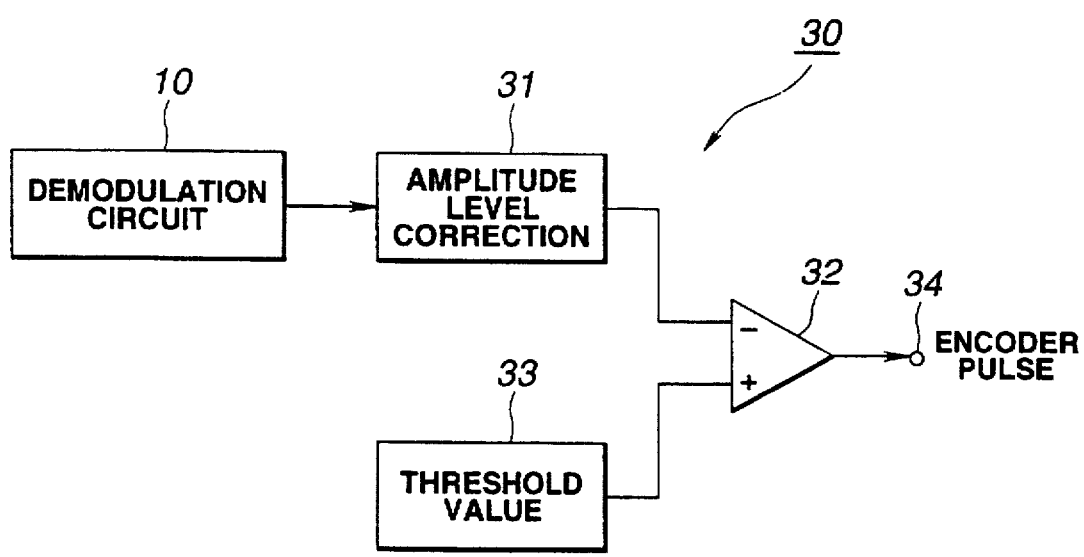
FIG. 6 is a block diagram showing a main portion of a rotation position detecting device of a second embodiment in accordance with the present invention.

That is, as shown in FIG. 6, the rotation position detecting device according to the second embodiment has a configuration having an encoder pulse generation circuit 30 at a later stage of the demodulation circuit 10. The rotation position detecting device according to the second embodiment has the same configuration as the rotation position detecting device in accordance with the first embodiment, except that the encoder pulse generation circuit 30 is added as shown in FIG. 6. For this reason, in explaining the rotation position detecting device according to the second embodiment, only the encoder pulse generation circuit 30 is explained, and then the explanation of the other portions is omitted. Further, in the encoder pulse generation circuit 30, there are two circuits for the first and second phases of the brush-less motor 1. However, only the difference is that the rotation position detection signal for the first phase is sent from the demodulation circuit 10 or that the rotation position detection signal for the second phase is sent, and then the circuit configurations are same to each other. Then, the encoder pulse generation circuit 30 to which the rotation position detection signal for the first phase is sent is only explained in the following explanation, and the encoder pulse generation circuit to which the rotation position detection signal for the second phase is sent is not explained.

At first, the encoder pulse generation circuit 30 includes a threshold value generation circuit 33, an amplitude level correction section 31 and a comparator 32. The threshold value generation circuit 33 outputs a threshold value signal of a predetermined level. The amplitude level correction section 31 carries out and outputs a correction of a predetermined amplitude level, to the rotation position detection signal for the first phase from the demodulation circuit 10. The comparator 32 compares the rotation position detection signal for the first phase, to which the correction of the amplitude level is carried out by the amplitude level correction section 31, with the threshold value signal from the threshold value generation circuit 33, and generates and outputs an encoder pulse for the first phase.

In the encoder pulse generation circuit 30 having the above mentioned configuration, the rotation position detection signal for the first phase, as shown in FIG. 4(c), from the demodulation circuit 10 is sent to the amplitude level correction section 31. This rotation position detection signal for the first phase becomes a period of $\lambda/2$ as shown in FIG. 4(c) when the rotor magnet of the brush-less motor 1 is rotated in synchronization with the frequency of the drive signal. However, in a case that the rotation of the rotor magnet is stopped or the synchronization is disordered or in other cases, the above period performance of $\lambda/2$ is confused, and then the rotation position detection signal with a period of $\lambda$ is outputted. Further, for example, if detecting the rotation position detection signal with the period of $\lambda/2$ obtained at a time of the synchronization rotation while maintaining its original state based on the threshold of the predetermined level and then generating the encoder pulse, the encoder pulse for the first phase and the encoder pulse for the second phase are detected in a state that they are out of phase by 180 degrees from each other, and thereby it is difficult to judge a rotation direction. For this reason, the amplitude level correction section 31 carries out a correction process of the amplitude level in such a way that the rotation position detection signal for the first phase with the period of $\lambda/2$ obtained at a time of the synchronization rotation and the rotation position detection signal with the period of $\lambda$ obtained in a case of a synchronization become the rotation position detection signal with the normal period of $\lambda$, and sends it to the comparator 32.

The threshold value signal of the predetermined level is sent to the comparator 32 from the threshold value generation circuit 33. The comparator 32 compares a corrected rotation position detection signal having the normal period of λ with the threshold value signal of the predetermined level, and generates the encoder pulse for the first phase having the period of λ as shown in FIG. 4(d), and outputs it through an output terminal 34.

The above mentioned correction process and comparison process of the amplitude level are carried out for the rotation position detection signal for the second phase, and thereby the encoder pulse for the second phase having the period of λ is generated and outputted, as shown in FIG. 4(e).

A mountain of the wave form of the rotation position detection signal is obtained relative to each of the pole number while the brush-less motor 1 is rotated one turn. Thus, it is possible to obtain each of the encoder pulse having the period of λ with the pole number as a resolution, by carrying out the predetermined amplitude level correction for each of the rotation position detection signals and by comparing the threshold value signal and the level. As a result, it is possible to judge the rotation direction in a normal direction or a reverse direction by detecting a phase relation between the respective encoder pulses, and also possible to detect a rotation number (rotation speed) by counting any of the encoder pulses and to determine any positioning by combining a slow speed gear mechanism.

A rotation position detecting device of a third embodiment in accordance with the present invention will be explained hereafter. The rotation position detecting device according to the third embodiment is adapted to output a pulse (Z pulse) of indicating a position of 0 degree of the rotation of the brush-less motor 1 based on the rotation position detection signal from the demodulation circuit 10.

Figure 7:
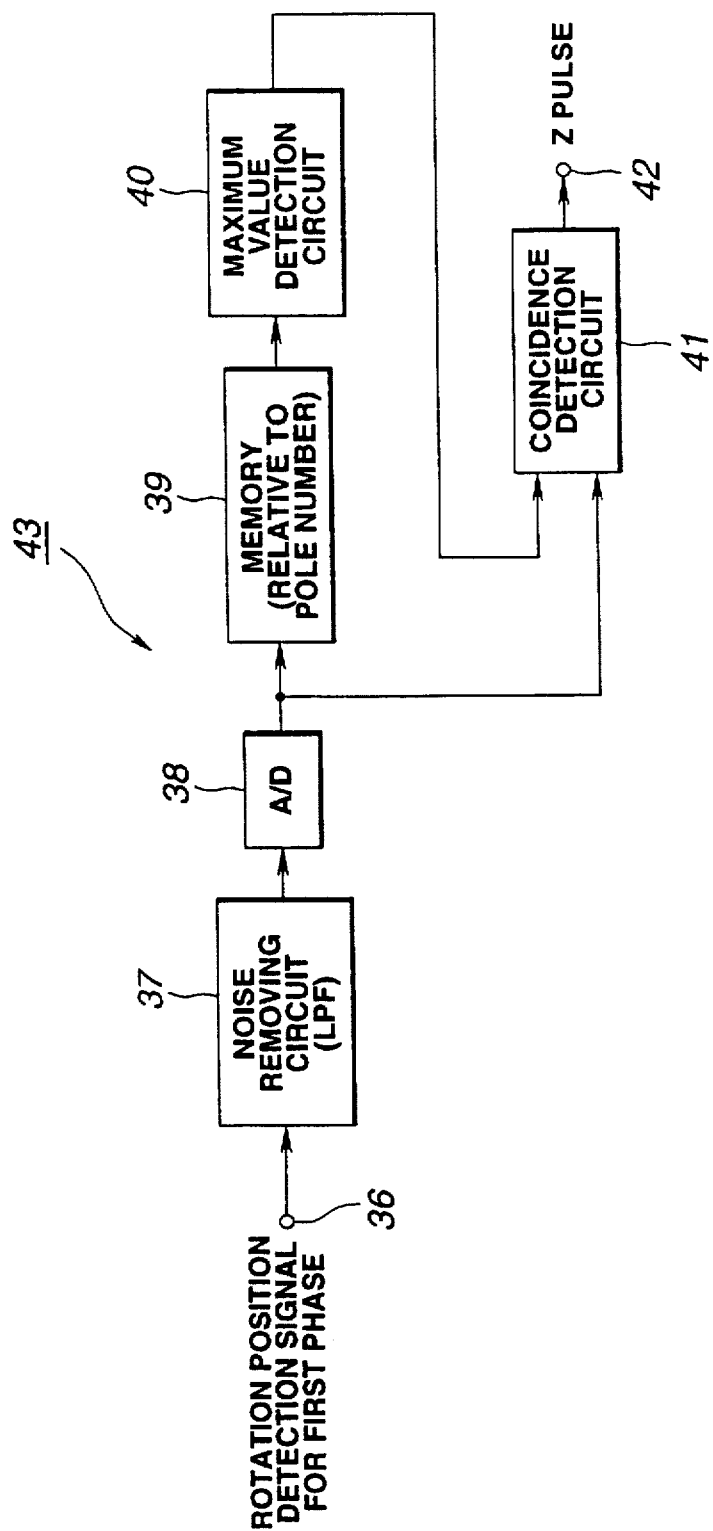
FIG. 7 is a block diagram showing a main portion of a rotation position detecting device of a third embodiment in accordance with the present invention.

That is, the rotation position detecting device according to the third embodiment has a configuration having the encoder pulse generating circuit 30 as explained in FIG. 6 and also a Z pulse generation circuit 43 as shown in FIG. 7, at a later stage of the demodulation circuit 10. The rotation position detecting device according to the third embodiment has the same configuration as the rotation position detecting device in accordance with the second embodiment, except that the Z pulse generation circuit 43 is added as shown in FIG. 7. For this reason, in explaining the rotation position detecting device according to the third embodiment, only the Z pulse generation circuit 43 is explained, and then the explanation of the other portions is omitted.

The Z pulse generation circuit 43 includes of a noise removing circuit (LPF) 37, an A/D converter 38, a memory 39, a maximum value detection circuit 40 and a coincidence detection circuit 41. The rotation position detection signal for the first phase is sent to the LPF 37 from the demodulation circuit 10. The A/D converter 38 converts the rotation position detection signal for the first phase from the noise removing circuit 37 into a digital value, and outputs it. The memory 39 stores rotation position detection data for the first phase relative to the pole number converted into the digital value. The maximum value detection circuit 40 detects the maximum value among the rotation position detection data for the first phase which is stored in the memory 39. And, the coincidence detection circuit 41 compares the detected maximum value with present first phase rotation position detection data from the A/D converter 38, and generates and outputs the Z pulse at a timing when both are in coincidence with each other.

In the Z pulse generation circuit 43 having the above mentioned configuration, the rotation position detection signal for the first phase is sent from the demodulation circuit 10 through the input terminal 36 to the LPF 36. The LPF 37 removes a noise component such as a spike noise and the like, from the rotation position detection signal for the first phase, and sends it to the A/D converter 38. The A/D converter 38 detects the digital value of the rotation detection signal for the first phase, from which the noise is removed, and sends it to the memory 39 as the rotation position detection data for the first phase. Then, the memory 39 stores the rotation position detection data relative to the pole number sent continuously. In this case, since the above mentioned twelve pole teeth are disposed in the first phase, the rotation position detection data relative to twelve elements is stored in the memory 39. The maximum value detection circuit 40 detects the data having the maximum value among the twelve rotation position detection data stored in the memory 39, and sends it to the coincidence detection circuit 41 as the maximum value detection data. Then, the rotation position detection data is sent from the A/D converter 38 to the coincidence detection circuit 41. The coincidence detection circuit 41 compares a level of the rotation position detection data from the A/D converter 38 with a level of the maximum value detection data from the maximum value detection circuit 40, and generates the Z pulse of indicating the 0 position of the brush-less motor 1 at a timing when both levels are coincident with each other, and sends it through the output terminal 42.

Figure 8:
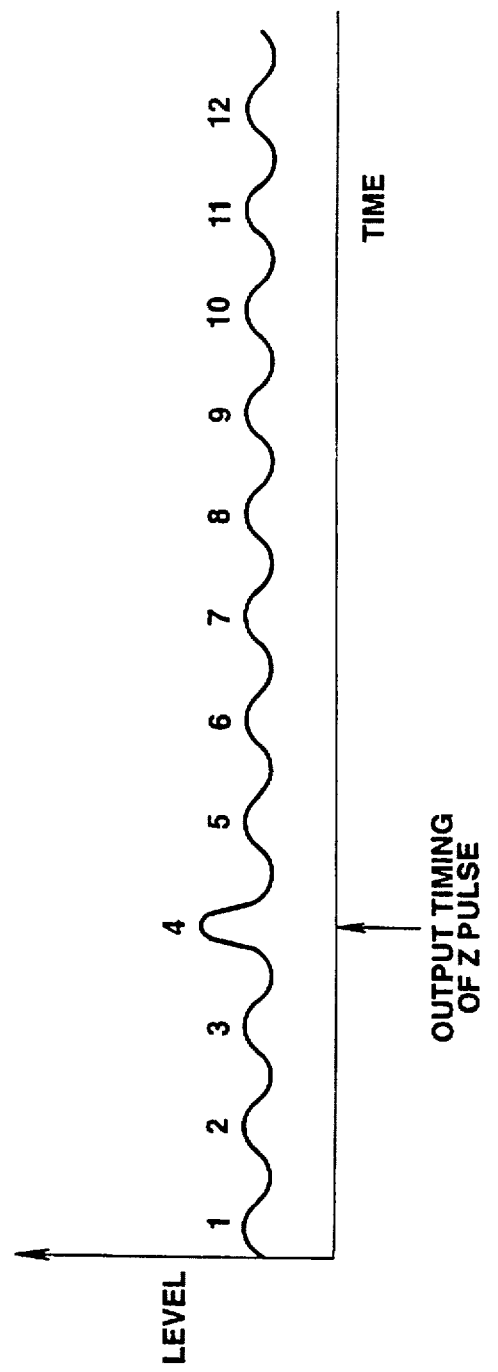
FIG. 8 is a wave form view explaining an output timing of a Z pulse from the rotation position detecting device of the third embodiment.

As shown in FIG. 8, in the rotation position detection signal, the mountain of the wave form relative to the pole number is obtained while the motor is rotated one turn. However, the mountain of the wave form is not always in the same level. There are respective level errors because of a shape error of a fixed yoke, an eccentricity of the rotor magnet and the like. This level error appears so to speak as "peculiarity" of the motor. In a case of the motor as shown in FIG. 8, the rotation position detection signal corresponding to a fourth pole is in a level projecting than the other rotation position detection signals. For this reason, it is possible to define a predetermined position relative to one turn as 0 and to generate and output the Z pulse generated at this rotation timing of 0, as mentioned above, by detecting the maximum value among the twelve rotation position detection signals (in a case in FIG. 8, the rotation position detection signal at the fourth pole is the maximum value) and outputting the pulse at a timing when the level of the maximum value is in coincidence with that of a present rotation position detection signal.

The encoder pulse from the encoder pulse generation circuit 30 explained in FIG. 6 has a resolution relative to the pole number. For this reason, it is possible to freely determine the rotation position of the brush-less motor 1 by specifying a rotation standard position for the motor based on the Z pulse and counting the encoder pulse. In this case, once a counter of the encoder pulse is reset at a detection timing of the Z pulse, the output timing of the Z pulse is not varied. After that, it is possible to accurately grasp the present rotation position.

Incidentally, the rotation direction of the motor can be detected on the basis of the phase relation between the encoder pulse for the first phase and the encoder pulse for the second phase. Thus, a displacement of the detected timing, from a time when one Z pulse is detected, to a time when a next Z pulse is detected, has no influence.

In the explanation of the third embodiment, it is adapted to generate and output the Z pulse based on the rotation position detection signal for the first phase which is sent from the demodulation circuit 10. However, it is allowable to generate and output the Z pulse based on the rotation position detection signal for the second phase. Further, in the maximum value detection circuit 40, it is adapted to detect the maximum value among the rotation position detection data relative to the number of the twelve poles. However, even in a case of detecting the minimum value among the rotation position detection data relative to the number of the twelve poles, and in the coincidence detection circuit 41, detecting the coincidence between the minimum value detection data and the present rotation position detection signal and generating the Z pulse, it is possible to obtain the effect similar to the above mentioned case.

Figure 9:
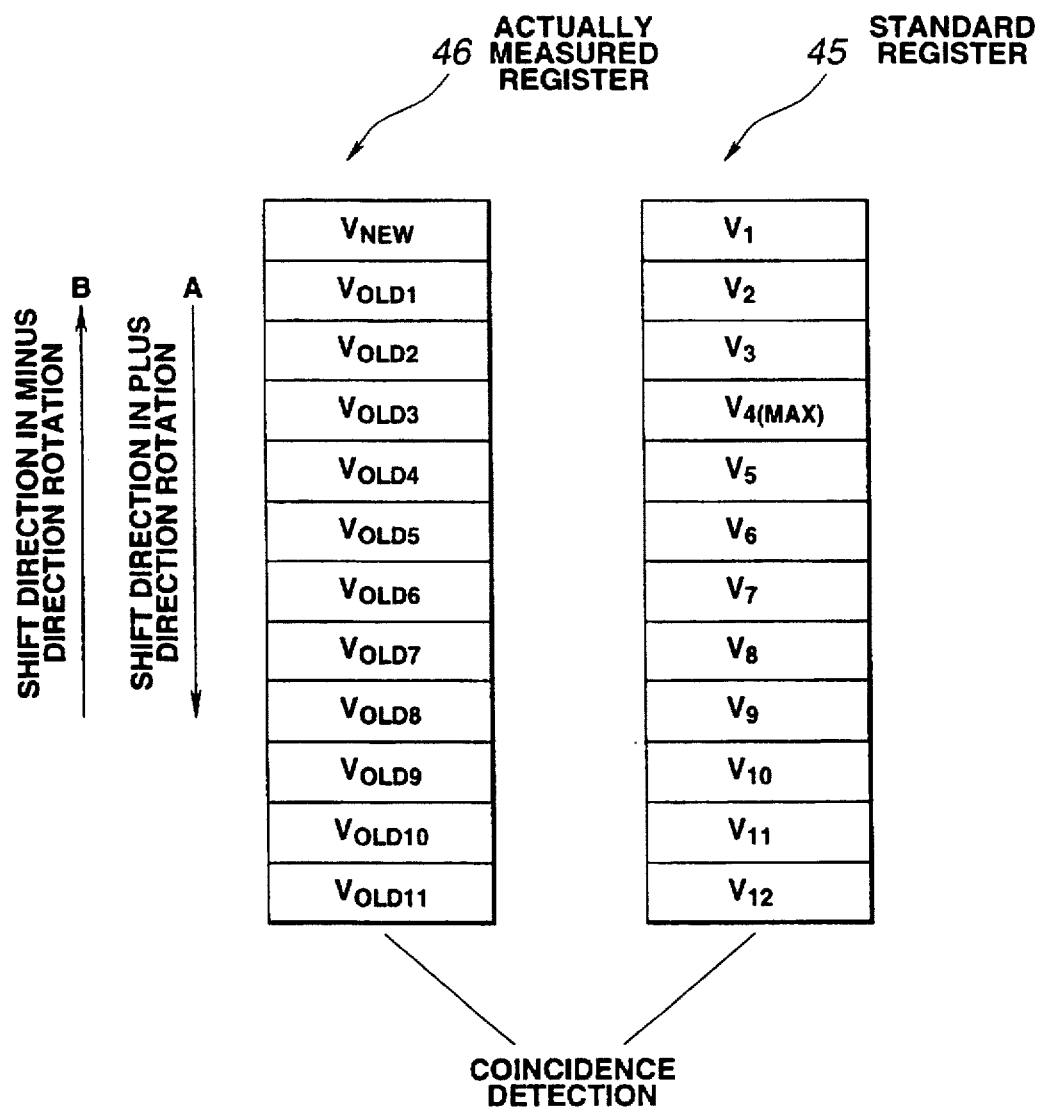
FIG. 9 is a view explaining a variation example of the rotation position detecting device of the third embodiment.

As a variation example of the third embodiment, it is allowable to dispose a standard register 45 and an actually measured value register 46 as shown in FIG. 9, instead of the memory 39 and the maximum value detection circuit 40. That is, the respective registers 45 and 46 have memory areas of 8 bit by 12 (a numeral relative to the pole number). In the standard register 45, there is stacked, as a standard value, twelve rotation position detection data (V1 to V12), as shown in FIG. 8, which can be obtained while the motor is rotated one turn. In the actually measured register 46, there is sequentially stacked, as an actually measured value, rotation position detection data (V NEW to V OLD11), which can be obtained when the motor is rotated.

The stacked standard value is stacked in advance in the standard register 45. In this case, for example, rotation position detection data in a fourth pole is the maximum value (V 4MAX). Further, a stack direction of each of the rotation position detection data which is the standard value is always one direction, irrespective of the rotation direction of the motor. Once the standard values are stored in all of memory areas, after that, they are only repeatedly read out and never rewritten. In contrast with this, the rotation position detection data, which can be obtained continuously by the rotation of the motor, is sequentially stacked in the actually measured register 46, which is sequentially shifted each time new rotation position detection data is sent. Further, it is possible to detect a plus or minus rotation direction of the motor, by detecting the phase relation between the rotation position detection signal from the first phase and the rotation position detection signal from the second phase. In a case that the motor is rotated in the plus direction, the data is sequentially stacked in an arrow A direction in FIG. 9 and read out, and in a case that the motor is rotated in the minus direction, the data is sequentially stacked in an arrow B direction in FIG. 9 and read out. In this way, the stack direction is adapted to be switched corresponding to the rotation direction of the motor. However, when detecting the output timing of the Z pulse, since the rotation direction of the motor is fixed in one direction, the stack direction of the actually measured value register 46 is fixed in one direction.

The standard value stacked in the standard register 45 is read out sequentially in synchronization with the rotation of the motor, and sent to the coincidence detection circuit 41. Further, the actually measured value register 46 sequentially shifts the rotation position detection data (V OLD11, V OLD10, V OLD9 ...) which was stacked previously and sends to the coincidence detection circuit 41, each time a new rotation position detection data (V NEW) is sent. The coincidence detection circuit 41 compares the standard value sent from the standard register 45 with the rotation position detection data sent sequentially from the actually measured value register 46, and outputs the Z pulse at a timing when a relative relation between both the value and the data becomes maximum. Actually, in this case, the Z pulse is outputted at a timing when the rotation position detection data having the same value as the standard value of the fourth pole (V 4MAX) is sent.

Accordingly, It is possible to freely determine the rotation position of the brush-less motor 1. Thus, it is possible to obtain an effect similar to the third embodiment. Incidentally, also in this case, once the counter of the encoder pulse is reset at the detection timing of the Z pulse, at a condition that the output timing of the Z pulse is not varied, after that, it is possible to grasp the present rotation position accurately. Further, it is allowable to use the third embodiment with this variation example to generate the Z pulse. In this case, it is possible to generate the Z pulse at a more accurate timing.

Here, as a prior art, there is known a rotation angle sensor (resolver), which detects, as a mechanical rotation angle, an amplitude output of an induction voltage obtained from a stator coil corresponding to an angle displacement of a rotator, by placing, at an angle of 90, the two stator coils around a rotator coil, and by sending an A.C. voltage having a predetermined frequency to the rotator coil. Further, a resolver/digital converter (R/D converter) is also known, which converts an analog signal from the resolver into digital data based on a predetermined algorithm.

The rotation position detecting device according to the second embodiment has a limit in the resolution relative to the pole number. However, the rotation position detecting device according to the fourth embodiment of the present invention can obtain the resolution equal to or more than the pole number.

Figure 10:
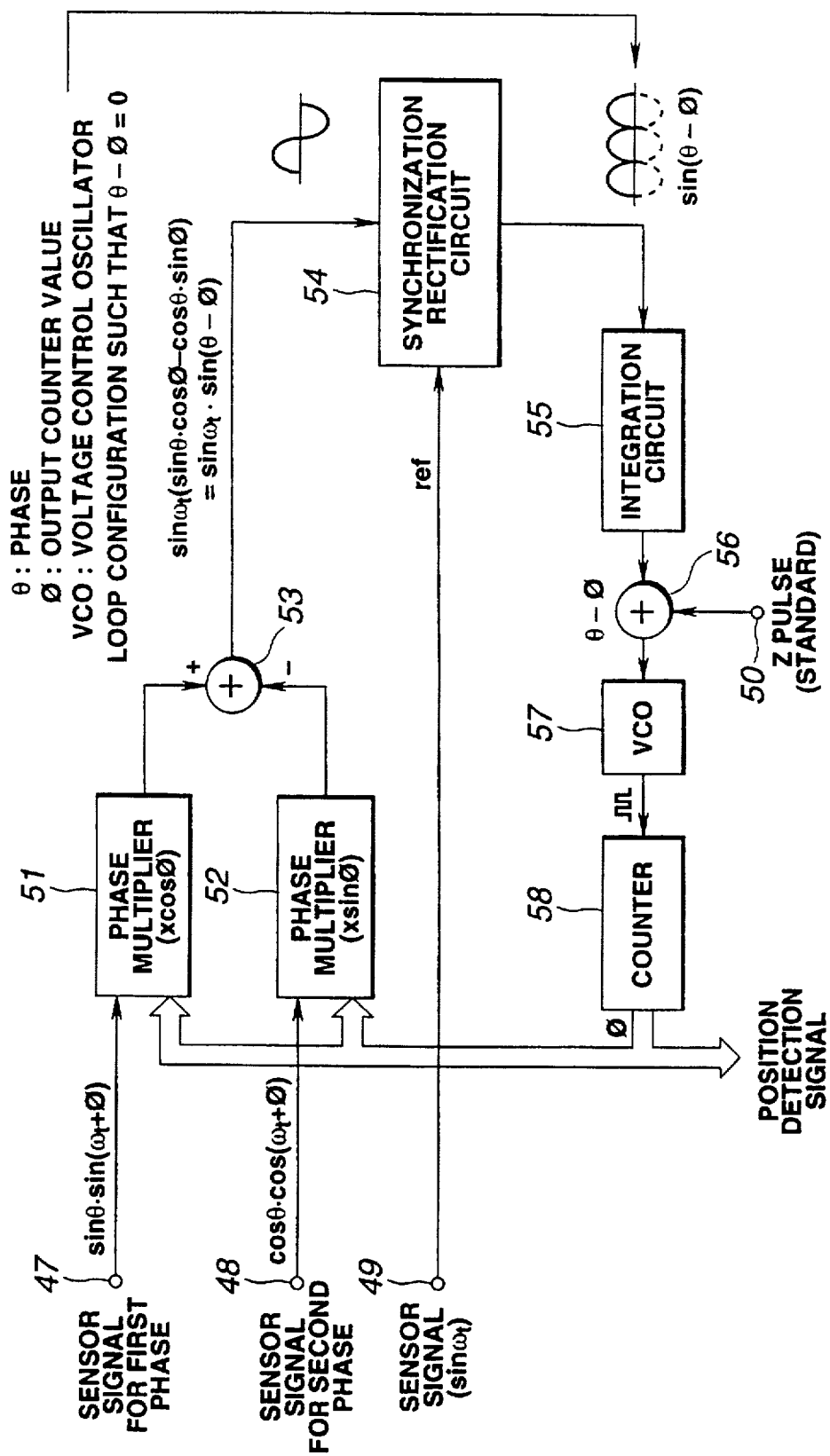
FIG. 10 is a block diagram showing a main portion of a rotation position detecting device of a fourth embodiment in accordance with the present invention.

That is, in the rotation position detecting device according to the fourth embodiment, as shown in FIG. 10, the configuration itself is a configuration similar to the R/D converter. However, the device is adapted to input the respective sensor signals from the demodulation circuit 10 shown in FIG. 1 instead of the analog signal from the resolver, and to input the sensor signal from the sensor signal generation circuit 3 instead of the drive signal of the motor inputted as the standard signal.

In the rotation position detecting device according to the fourth embodiment of the present invention having the configuration as mentioned above, the rotation position detection signal for the first phase ($\sin\theta \cdot \sin(\omega t + \phi)$) is sent to the above device from the demodulation circuit 10 through an input terminal 47 as shown in FIG. 10, the rotation position detection signal for the second phase ($\cos\theta \cdot \cos(\omega t + \phi)$) is sent to the device from the demodulation circuit 10 through an input terminal 48, and the sensor signal ($\sin\omega t$) is sent to the device from the sensor signal generation circuit 3 through an input terminal 49. The rotation position detection signal for the first phase is sent to a first multiplying circuit 51 to which a position detection data ($\phi$) is sent from a counter 58 explained later. The rotation position detection signal for the second phase is sent to a second multiplying circuit 52 to which the position detection data is sent. The sensor signal is sent to a synchronization rectification circuit 54 as the standard signal (ref).

The first multiplying circuit 51 multiplies the rotation position detection signal for the first phase by the position detection data ($\cos\phi$) defined as a cosine wave, and sends this multiplication signal to a multiplier 53. Further, the second multiplying circuit 52 multiplies the rotation position detection signal for the second phase by the position detection data ($\sin\phi$) defined as a sine wave, and sends this multiplication signal to the multiplier 53. The multiplier 53 sets the multiplication signal from the first multiplier 51 as plus (+), and the multiplication signal from the second multiplier 52 as minus (−) and multiplies both signals by each other, and sends this multiplication signal (sinω (sinθ·cosφ−cosθ·sinφ)=sinω·sin(θ−φ))

to the synchronization rectification circuit 54. The sensor signal (sinωt) is sent to the synchronization rectification circuit 54 through the input terminal 49 from the sensor signal generation circuit 3 as the standard signal. The synchronization rectification circuit 54 rectifies both waves of the multiplication signal with the standard signal as a standard, and sends this both wave rectification signal (sin (θ−ω)) to an integrating circuit 55. The integrating circuit 55 integrates this both wave rectification signal, and sends this integration signal (θ−φ) through an adder 56 to a voltage control oscillator (VCO) 57. The VCO 57 oscillates a pulse having a frequency corresponding to the integration signal, and sends it to the counter 58. The counter 58 counts the pulse by a predetermined number, and then generates and outputs the rotation position detection data (φ) of indicating the rotation position between the poles of the brush-less motor 1. The rotation position detection data are outputted outside, and also sent to the first and second multiplying circuits 51 and 52, and as mentioned above, are set to cosθ and sinθ, respectively, and multiplied by the sensor signal for the first phase and by the sensor signal for the second phase. Incidentally, this loop is adapted to operate in such a way that the integration signal becomes θ−φ=0.

A phase relation between the sensor signals for the first phase and for the second phase which are outputted from this appropriate rotation position detecting device is the same as the phase relation between the amplitude output of the induction voltage obtained from the stator coil corresponding to the angle displacement of the rotator. Thus, it is possible to carry out a digital conversion of each of the sensor signals by using the R/D converter. This position detection output from the R/D converter indicates the rotation position between the poles of the motor. As a result, it is possible to make the resolution for the rotation position detection of the motor equal to or less than a distance between the poles to thereby improve the resolution performance.

In FIG. 10, it is allowable that the Z pulse is sent through an input terminal 50, this Z pulse and the integration signal from the integrating circuit 55 are added by the adder 56, and the VCO 57 is oscillated and driven on the basis of this added signal. In this case, since the standard position is known from the Z pulse, the rotation position of the motor can be detected more minutely at a resolution equal to or less than the distance between the poles.

Incidentally, when carrying out this R/D conversion, it is desirable to adjust in advance a wire construction of the brush-less motor 1 and the like, in such a way that there is little irregularity in the rotation position detection signal (impedance wave form) between the respective poles and that each of the rotation position detection signal is changed as an ideal sine wave function for a phase angle (position).

The resolution of the above mentioned rotation position detection depends on an error of the respective rotation position detection signals (impedance output) from the demodulation circuit 10, a S/N ratio and an accuracy of Cosφ and Sinφ of the respective integration circuits 51 and 52. For this reason, the conventional R/D converter adjusts a wire construction on a connected side of the motor in order to obtain the resolution with a high accuracy. However, such an adjustment is very difficult.

A first variation example of the rotation position detecting device according to the fourth embodiment explained below intends to omit a difficult adjustment of the wire construction on the motor side and the like to thereby improve a detection accuracy, by electrically correcting the error of the respective rotation position detection signal and the accuracy of the respective multiplying circuit 51 and 52.

Figure 11:
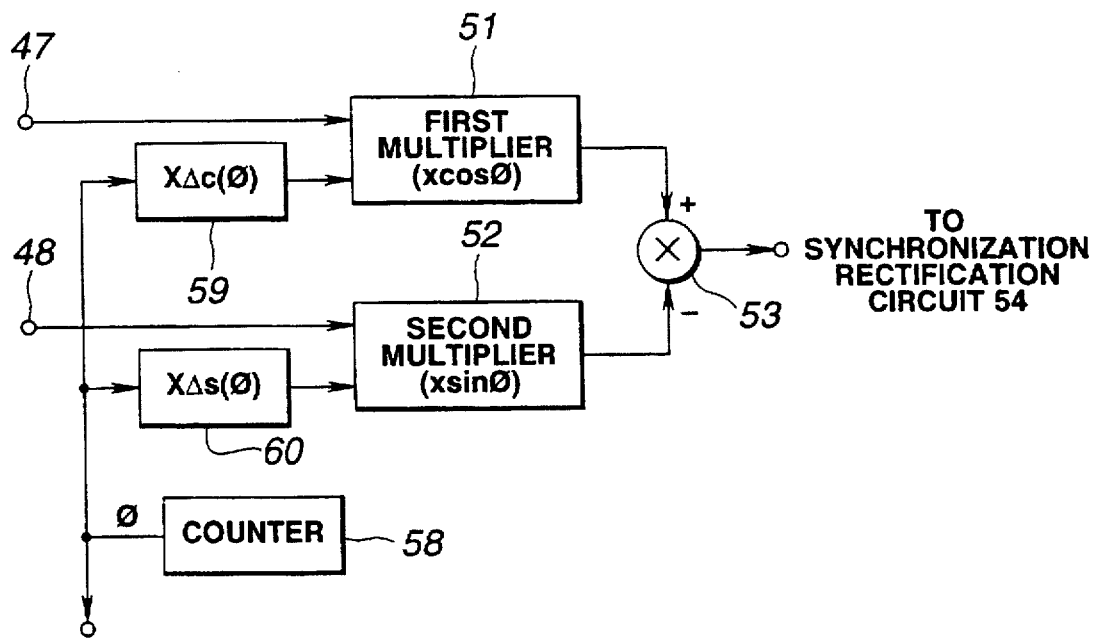
FIG. 11 is a block diagram showing a main portion of a first variation example of the rotation position detecting device of the fourth embodiment.

That is, as shown in FIG. 11, the rotation position detecting device according to the first variation example has a configuration in which a first correction circuit 59 and a second correction circuit 60 are respectively disposed at a former stage of a first multiplying circuit 51 and at a former stage of a second multiplying circuit 52. The first correction circuit 59 generates a first correction data to correct the rotation position detection signal for the first phase from the demodulation circuit 10. The second correction circuit 60 generates a second correction data to correct the rotation position detection signal for the second phase from the demodulation circuit 10.

Figure 12:
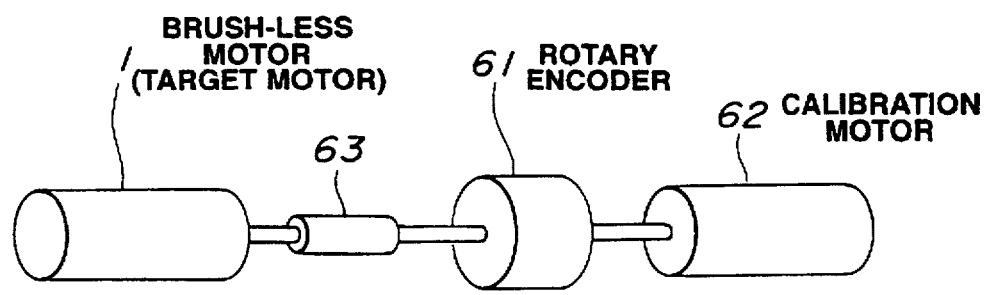
FIG. 12 is a conception view of a calibration device for detecting correction data in order to correct rotation position detection data from a counter, in the first variation example.

The first correction data and the second correction data, which are measured in advance corresponding to the motor to which this appropriate rotation position detection device is connected, are respectively stored in the first and second correction circuits 59 and 60. Actually, the respective correction data is measured as described below. That is, as shown in FIG. 12, a rotation shaft of a so-called rotary encoder 61 to which a calibration motor 62 is connected is connected through a connecting tube 63 to a rotation shaft of the brush-less motor 1 which is a target, and then the calibration motor 62 is accurately rotated step by step for a micro angle. And, the R/D converter show in FIG. 10 is operated which is disposed in the brush-less motor 1 together with the calibration motor 62. A loop is fixed in such a way that (φ=θ, and the first correction data (Δc(φ)) and the second correction data (Δs(φ)) are sequentially measured. The respective correction data which are prepared in advance in this way are stored in the respective correction circuits 59 and 60.

The first correction circuit 59, when the rotation position detection data (φ)) is sent from the counter 58, corrects the data based on the first correction data (Δc(φ)), and sends to the first multiplying circuit 51. The second correction circuit 60, when the rotation position detection data (φ)) is sent from the counter 58, corrects the data based on the second correction data (Δs(φ)), and sends to the second multiplying circuit 52. The first multiplying circuit 51 multiplies the rotation position detection signal for the first phase which is sent through the input terminal 47, by the first correction data, and sends to the multiplier 53. And, the second multiplying circuit 52 multiplies the rotation position detection signal for the second phase which is sent through the input terminal 48, by the second correction data, and sends to the multiplier 53. As mentioned above, each of the correction data is a value which is measured in advance corresponding to the connected motor. Thus, it is possible to most suitably correct the rotation position detection signal for each of the phases. As a result, irrespective of the error of the respective rotation position detection signals (impedance output) from the demodulation circuit 10, the S/N ratio and the accuracy of Cosφ and Sinφ of the respective multiplying circuits 51 and 52, and without adjusting the wire construction on the connected side of the motor, it is possible to obtain the rotation position detection data with a high accuracy and resolution.

A second variation example of the rotation position detecting device according to the fourth embodiment will be explained hereafter. Although in the explanation of the first variation example, each of the first and second correction data is prepared in advance to correct the rotation position detection signal in each of phases, in the rotation position detecting device according to the second variation example, common correction data is used for correcting the rotation position detection signal in each of the phases.

Figure 13:
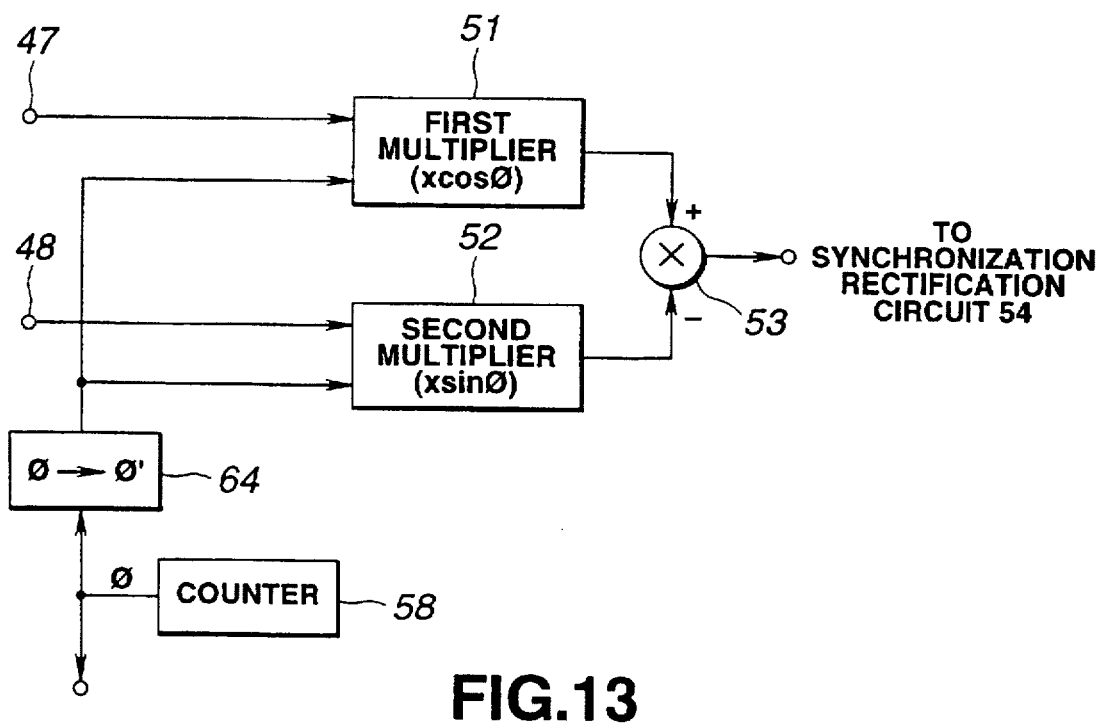
FIG. 13 is a block diagram showing a main portion of a second variation example of the rotation position detecting device of the fourth embodiment.

That is, as shown in FIG. 13, the rotation position detecting device according to the second variation example has a configuration in which a correction circuit 64 is disposed at a former stage of a first multiplying circuit 51 and a second multiplying circuit 52. The common correction data to correct rotation position detection data from a counter 58 is stored in the correction circuit 64.

Figure 14:
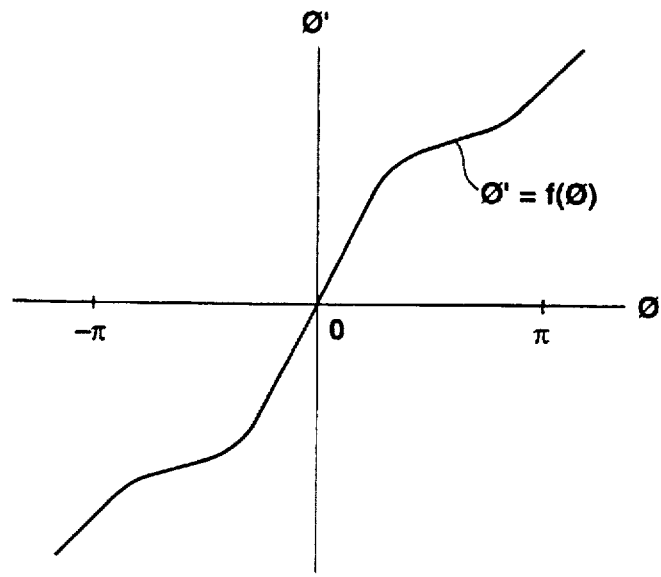
FIG. 14 is a graph showing a correction curve of correction data used for the second variation example.

In the correction circuit 64, there is stored in advance common correction data ($\Delta\phi$), which is a value determined on the basis of a correction curve indicating a relation between rotation position detection data ($\phi$)) outputted from a counter 58 as shown in FIG. 14, and rotation position detection data ($\phi'$) obtained by suitably correcting the above rotation position detection data ($\phi$), by using the rotary encoder 61 explained in FIG. 12. The correction circuit 64, when the rotation position detection data ($\phi$) is sent from the counter 58, corrects the data based on the common correction data, and thereby generates correction rotation position detection data ($\phi+\Delta\phi=\phi'$), and sends the data to the multiplying circuits 51 and 52. As a result, it is possible to obtain the effect similar to the first variation example.

Incidentally, in the explanations of the respective variation examples, the correction data is generated by using the rotary encoder 61 and the calibration motor 62. However, the correction data can be generated, for example, by substituting something to have a little accurate encoding function, such as image synchronization data included in image data reproduced from an optical disk for image, bit synchronization data included in voice data reproduced from a standard type reproducing dedicated disk for music, and the like. In this case, it is measured at a realtime while the brush-less motor 1 is rotated.

A rotation position detecting device according to a fifth embodiment of the present invention will be explained. The rotation position detecting device according to the fifth embodiment mounts a cogging drive circuit 56 68 as shown in FIG. 15 on the rotation position detecting device explained previously to thereby carry out a cogging-less, jitter-less, constant torque drive of a motor.

Figure 15:
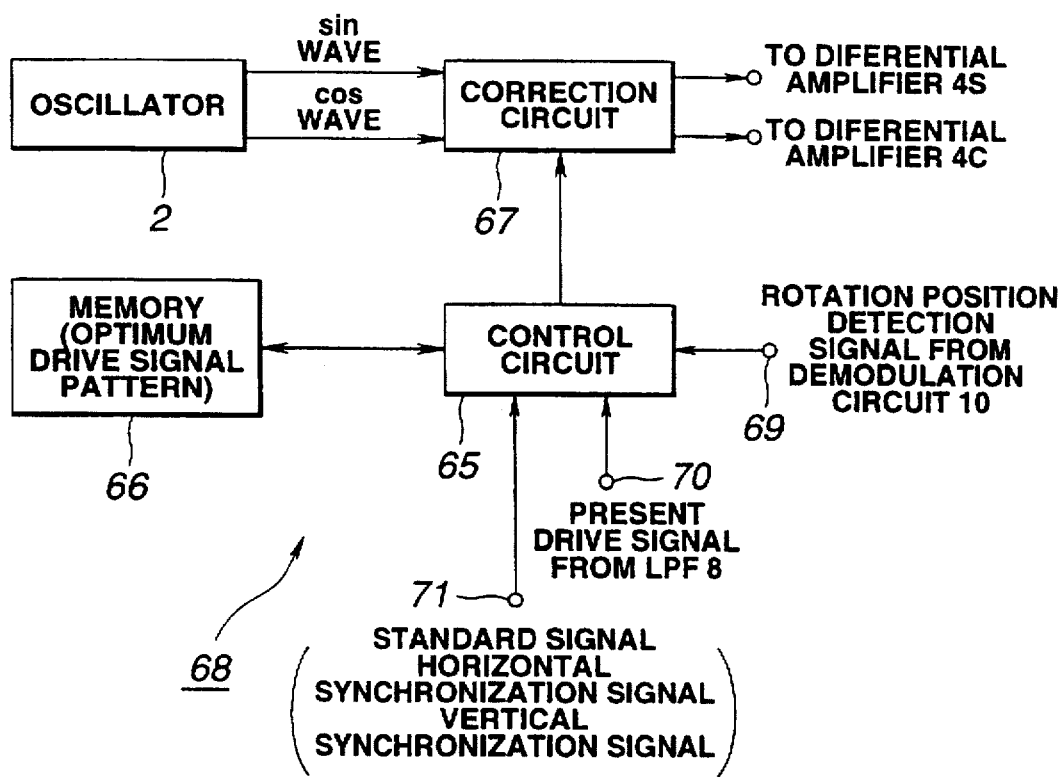
FIG. 15 is a block diagram showing a rotation position detecting device of a fifth embodiment in accordance with the present invention.

In FIG. 15, the cogging drive circuit 68 has a correction circuit 67, a memory 66 and a control circuit 65. The correction circuit 67 carries out a predetermined correction process for the sine drive signal and the cosine drive signal from the oscillator 2 and sends to the respective differential amplification circuits 4S and 4C. The memory 66 stores an optimum drive signal pattern which is a pattern of each of the drive signals enabling the cogging-less, jitter-less, constant torque drive of the motor. The control circuit 65 detects the pattern of each of the drive signals which is optimum for a condition and stores it in the memory 66, based on the rotation position detection signal from the demodulation circuit 10, the present drive signal from the LPF 8 and the standard signal from an electronic apparatus which is added to the motor, and further in an actual drive, reads out the optimum drive signal pattern from this memory, and corrects and controls each of the drive signals through the correction circuit 67.

Figure 16:
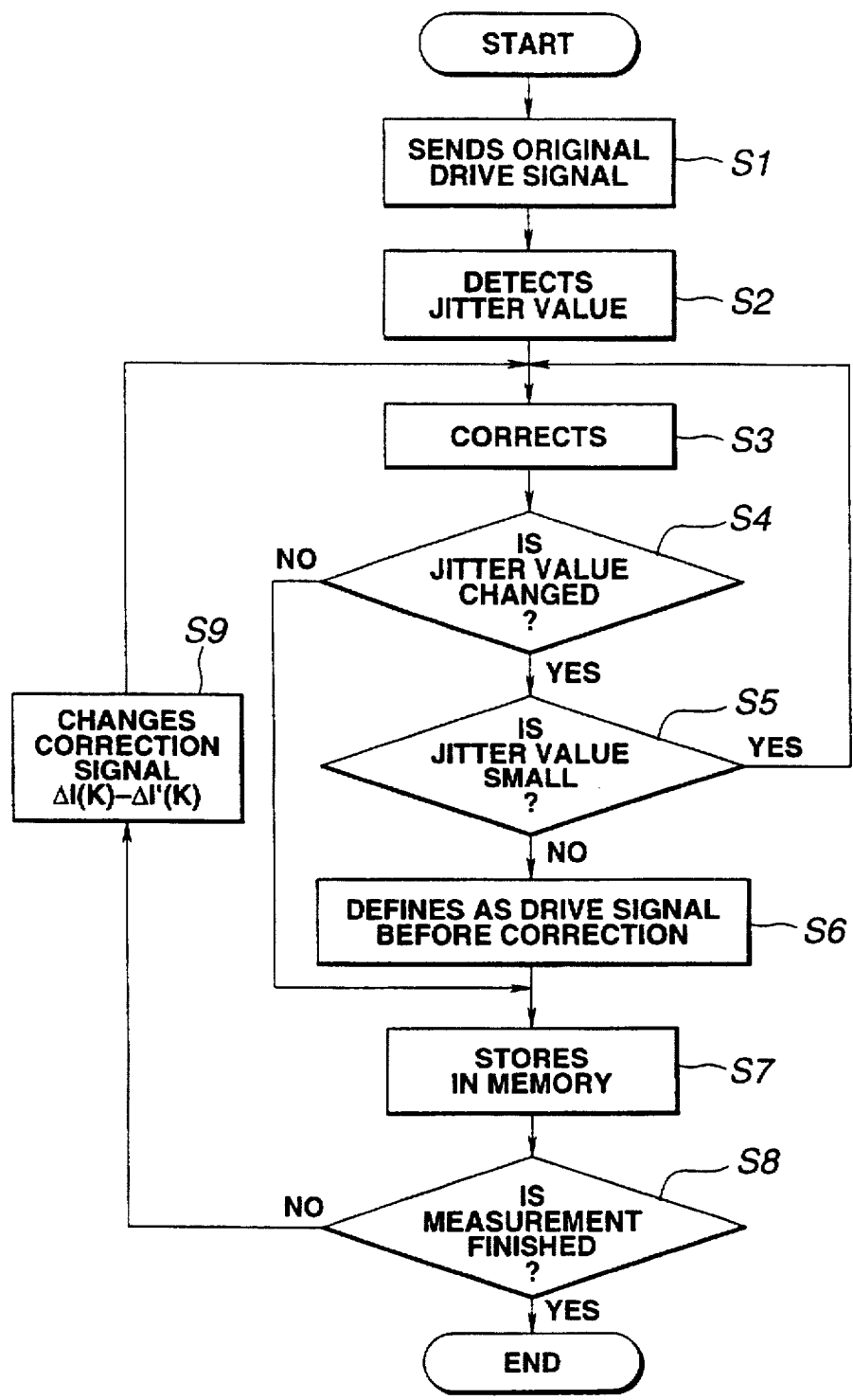
FIG. 16 is a flow chart explaining an operation of the rotation position detecting device of the fifth embodiment.

The cogging drive circuit 68 having the above mentioned configuration becomes a pattern detection mode of detecting the optimum drive signal pattern before normally rotating and driving the motor. An operation of the pattern detection mode is shown in a flow chart of FIG. 16. The flow chart in FIG. 16 starts, for example, when a main power supply is turned on, and proceeds to a step S1.

At the step S1, the control circuit 65 controls the correction circuit 67 such that each of the drive signals outputted from the oscillator 2 is outputted while maintaining each original state (as an original drive signal) and proceeds to a step S2. At the step S2, the control circuit 65 detects a jitter value (or allowable for an absolute amount of the cogging) based on the standard signal sent through an input terminal 71 from an electronic apparatus loaded on the motor since the motor is driven by the original drive signal, and once stores it in a RAM mounted within the control circuit 65 as an initial jitter value, and proceeds to a step S3.

Actually, as the standard signal, in a case that the electronic apparatus provided as a load of the motor is an image apparatus, such as a video tape recorder, an optical video disk and the like, it is possible to use a horizontal synchronization signal or a vertical synchronization signal included in an image signal, and in a case that the electronic apparatus is a music reproducing dedicated optical disk, it is possible to use a frame synchronization signal or a RF signal. Also, encoded data from a so-called rotary encoder is allowable.

At the step S3, the control circuit 65 detects a rotation angle based on the rotation position detection signal sent through an input terminal 69, and controls the correction circuit 67 so as to add a correction signal ($\Delta I(\theta)$) having a predetermined micro level corresponding to the rotation angle to each of the drive signals ($I(\theta)$), that is, ($I(\theta)\rightarrow I(\theta)+\Delta I(\theta)$). Next, the control circuits 65 detects the jitter value obtained by adding this correction signal and by driving the motor, based on the rotation position detection signal sent through the input terminal 69, by a k point (k is 1 to n) for one turn, and stores it in the RAM once, and proceeds to a step S4, that is, ($I(k)\rightarrow In(k)+\Delta I(k):In(k)$ is a nominal current value in the k point).

In the step S4, the control circuit 65 reads out and compares an original jitter value stored in the RAM, and the above mentioned jitter value obtained by adding the correction signal and driving the motor, and judges whether or not there is a change in the jitter value. And, if YES, the control circuit 65 proceeds to a step S5. If NO, it is indicated that the value in a present drive signal is proper, and thereby the control circuit 65 proceeds to a step S7. Then, the control circuit 65 stores the value of the present drive signal sent through an input terminal 70 from the LPF 8, in the memory 66, and proceeds to a step S8.

At the step S5, the control circuit 65 compares the respective jitter values, and judges whether or not the jitter value after the correction becomes smaller than that before the correction. If NO, the control circuit 65 proceeds to a step S6. And, at this step S5, if judged as YES, the control circuit 65 returns to the step S3 since there is a possibility that the jitter value can be more smaller by adding the correction signal. And, until judged as NO, a routine from the step S3 to the step S5 is repeated.

At the step S5, if judged as NO, it is indicated that the jitter value is increased by adding the correction signal and that the value of the drive signal before one correction is proper than the value of the present drive signal. For this reason, at the step S6, the control circuit 65 detects the value of the drive signal before one correction, and proceeds to a step S7. And, at this step S7, the control circuit 65 stores in the memory 66 the value of the drive signal before the above mentioned one correction, and proceeds to a step S8. At the step S8, the control circuit 65 judges whether or not all the measurements are finished. If YES, the control circuit 65 finishes the pattern detection mode as it is, and if NO, proceeds to a step S9. At the step S9, since all the measurements are not finished, the control circuit 65 changes the value ($\Delta I(k)$) of the correction signal into a value ($\Delta I'(k)$) of a new correction signal, and returns to the step S3. After that, the control circuit 65 repeats the respective routine until judged as YES at the step S8.

Accordingly, the value of the drive signal which is optimum for the condition is stored in the memory 66, and thereby the optimum drive signal pattern is generated. The control circuit 65, when the optimum drive signal pattern is generated in the memory 66, reads out it at a time of a normal rotation control, and controls the correction circuit 67 such that each of the drive signals from the oscillator 2 is suitably corrected on the basis of the optimum drive signal pattern. The optimum drive signal pattern stored in the memory 66 is data measured in advance so as to be the optimum drive signal for the condition. For this reason, it is possible to carry out the cogging-less, jitter-less, constant torque drive of the motor, by correcting the each of the drive signals based on the optimum drive signal pattern. Further, even a cheap motor can carry out such a torque-clip-less control. As a result, for example, it is possible to improve an accuracy of a portable headphone player, an optical disk player or the like, in which such a cheap motor is used, and possible to make a cost thereof cheaper.

Incidentally, it is not needed to detect such an optimum drive signal pattern at a time of a normal rotation drive of a motor. And, in the pattern detection mode, the detection can be finished while the motor is rotated and driven few turns to several tens of turns, and it does not take a long time. Further, the value of the correction signal is, for example, a value of a sine wave having one period at k=1 to n, a value increased or decreased at an angle relative to a pole number of a motor, or a function relative to harmonic waves thereof. Thus, actually, some estimate can be given, and thereby it is possible to make a convergence thereof more faster.

Here, if a level of the correction signal is not micro, there is a fear that hunting is induced in jitter amount. However, if the level of the correction signal is too micro, the convergence is delayed. For this reason, it is desirable to carry out a so-called weight setting for the correction signal (ΔI(k)) and to suitably change this weight setting coefficient. This weight setting is carried out, for example, by using a Newton method in a so-called linear network method of calculating d (a jitter value) / d(ΔI(k)) and defining it as the coefficient, or by using a bark propagation method (a BP method) in a neutral network. If it is possible to detect a current distribution of causing the jitter value and the like to be minimum, any method can be applied.

Incidentally, in the fifth embodiment, it is explained to measure the jitter value or the absolute amount of the cogging. However, in a case that the appropriate rotation position detecting device is provided in a pick-up device which can detect vibration of a motor, it is possible to obtain an effect similar to the above mentioned cases, by detecting the vibration of the motor and then generating the optimum drive signal pattern.

At the step S9, the value of the correction signal is updated every loop. However, it is allowable to sequentially modify it (change I at an order of 1 to n).

The optimum drive signal pattern is detected before the motor is normally rotated and driven. However, it is allowable to detect in advance the optimum drive signal pattern corresponding to the motor, store in the ROM, mount in a product, and rotate and drive the motor while referring to this ROM table corresponding to the rotation speed at a time of driving the motor. In this case, it is desirable that the jitter value is constant and not proportional to the rotation speed. However, even if changed, it is allowable to insert in a form of a table reference, by carrying out the above mentioned optimization at the rotation speed.

A motor device will be explained as a sixth embodiment in accordance with the present invention. In the sixth embodiment, as shown in FIG. 17, envelope of a sensor signal obtained from a demodulation circuit 10 is sent to a sensor voltage correction circuit 12 to thereby correct the voltage of the sensor signal corresponding to a sine wave drive signal form the oscillator 2.

Figure 17:
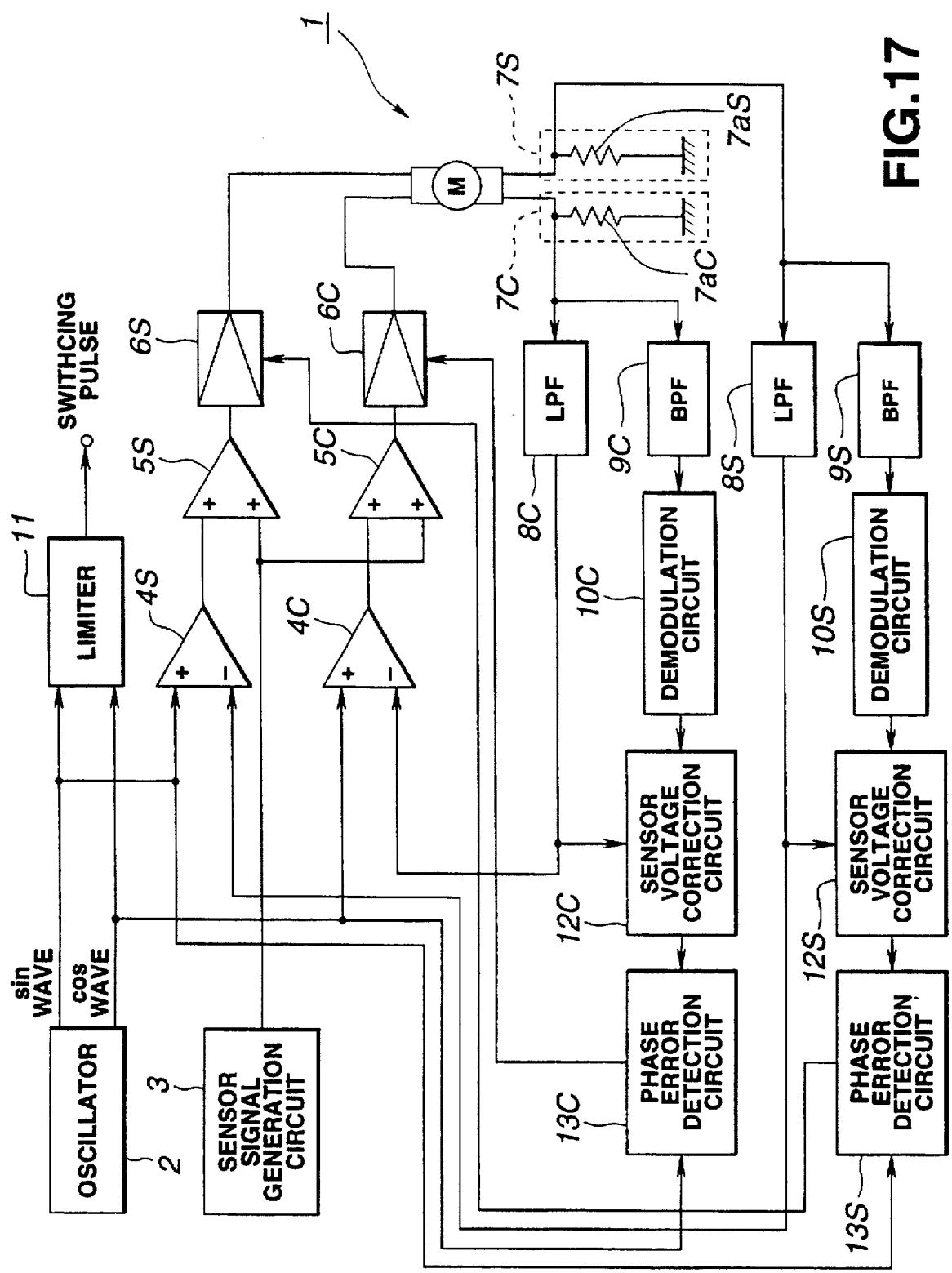
FIG. 17 is a block diagram showing a motor device as a sixth embodiment in accordance with the present invention.

Here, in FIG. 17, a motor drive signal in each of phases (a sine wave and a cosine wave) of a motor 1 is detected by each of drive signal detection circuits 7S and 7C. That is, a current value of the sine wave drive signal to which a sensor signal sent to the brush-less motor 1 through an amplifier 6S is added is detected as a voltage value by a resistor 7aS of the drive signal detection circuit 7S. A current value of the cosine wave drive signal to which a sensor signal sent to the brush-less motor 1 through an amplifier 6C is added is detected as the voltage value by a resistor 7aC of the drive signal detection circuit 7C. The motor drive signal including the sine wave drive signal detected by the resistor 7aS of the drive signal detection circuit 7S is feed-backed to an inverting input terminal (−) of a differential amplifier 4S through a LPF (low pass filter) 8S. The motor drive signal including the cosine wave drive signal detected by the resistor 7aC of the drive signal detection circuit 7C is feed-backed to an inverting input terminal (−) of a differential amplifier 4C of a LPF 8C. Further, the signal detected by the resistor 7aS of the drive signal detection circuit 7S is sent to a BPF (band pass filter) 9S and the sensor signal having a high frequency is extracted, and sent to a demodulation circuit 10S, and envelope is detected. This is sent to a sensor voltage correction circuit 12S. The sine wave drive signal is sent to the sensor voltage correction circuit 12S from the LPF 8S, and then the sensor voltage is corrected corresponding to the sine wave drive signal. An output from the sensor voltage correction circuit 12S is sent to a circuit for a motor servo lock. However, in this example, a phase difference between the output and the sine wave drive signal from the oscillator 2 is detected by sending the output to a phase difference detection circuit 13S, and this detected phase difference signal is sent to a gain control terminal of the amplifier 6S, and a rotation phase control is carried out by controlling this gain of the amplifier 6S. Similarly, in a case of the signal detected by the resistor 7aC of the drive signal detection circuit 7C, the sensor signal is extracted by the BPF 9C, and sent to a demodulation circuit 10C, and envelop is detected and sent to a sensor voltage correction circuit 12C. The cosine wave drive signal is sent to the sensor voltage correction circuit 12C from the LPF 8C. The sensor voltage is corrected corresponding to this cosine wave drive signal. For an output from the sensor voltage correction circuit 12C, a phase difference between the output and the cosine wave drive signal is detected by a phase difference detection circuit 13C. This detected phase difference signal is sent to a gain control terminal of the amplifier 6C.

Figure 18:
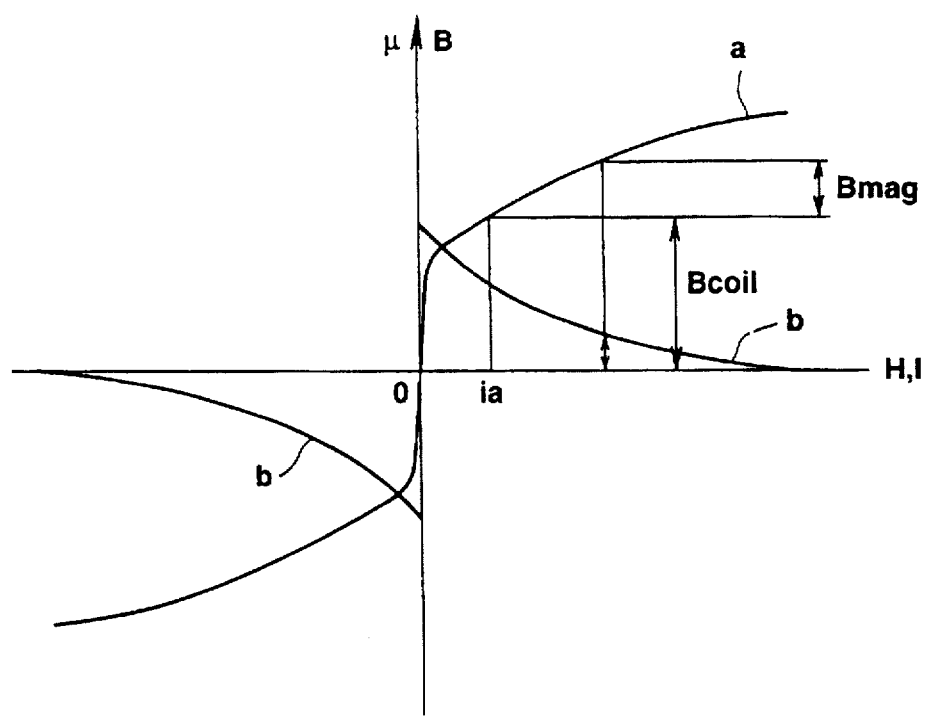
FIG. 18 is a view showing a magnetic flux B interlinked with a coil yoke of a motor and a magnetic permeability μ of a yoke.
Figure 19A:
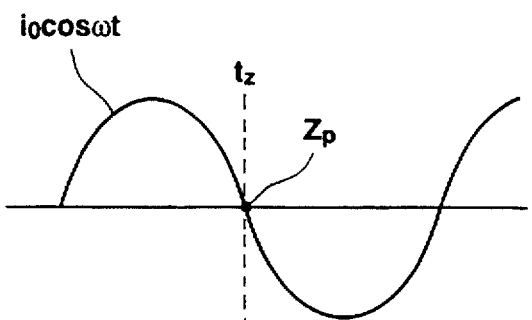
FIG. 19, consisting of FIGS. 19A–19D, is a view explaining a method of sampling a sensor signal at a timing of a zero-cross point of a drive signal.
Figure 19B:
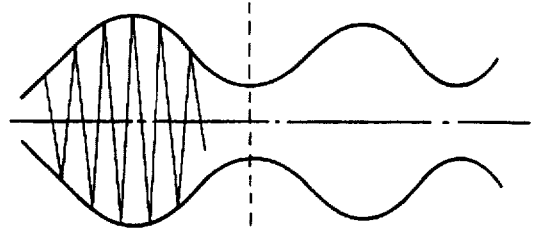
Figure 19C:
Figure 19D:
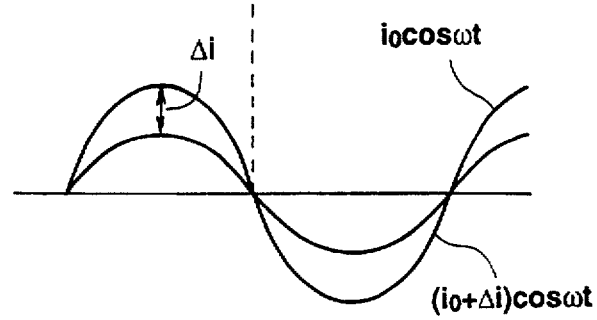

A correction of an envelop voltage of the sensor signal by means of each of the sensor voltage correction circuits 12S and 12C will be explained hereinafter. This is carried out in order to correct the error of the rotation position detection, due to the level change of the sensor signal detected corresponding to the change of the magnetic resistance, since the magnetic resistance of a yoke is changed corresponding to the drive current flowing in a coil of the motor. That is, a curve a in FIG. 18 shows a magnetic flux B interlinked at the coil yoke of the motor, and a curve b shows a magnetic permeability μ of the coil yoke. A horizontal axis in FIG. 18 represents a magnetic field H applied to the coil yoke and a current I flowing in the coil. As shown in the curve a in FIG. 18, the magnetic flux B interlinked at the coil yoke of the motor is a sum of an outer magnetic field $B_{mag}$ generated by the rotor magnet, and a magnet field $B_{coil}$ generated by the current flowing in the coil, for example, $i_a$. It is known that the larger the current i, the smaller the magnetic permeability μ, and thereby the magnetic resistance becomes larger. Thus, the level of the sensor signal detected corresponding to the drive current is changed, under a state that the sensor signal added to the drive signal is extracted from the demodulation circuit 10S or 10C. As a result, it is necessary to correct this changed amount. This correction can be carried out by using a function calculation or a table conversion.

Incidentally, the other portions shown in FIG. 17 are similar to those shown in FIG. 1. Then, identical reference numerals are given to the portions corresponding to the respective portions shown in FIG. 1, and the explanation is omitted.

By the way, as a rotation servo way of the motor, there is a zero-cross method. That is, a sensor output envelop is sampled, at a point that the drive current becomes zero. Based on it, a relation between a sensor voltage value and a phase angle when the drive current measured in advance is 0 is referred by using a table or an approximate function. The phase angle of the rotor is calculated. Then, a drive current value and a frequency are determined on the basis of the value.

FIG. 19 is a view explaining a method of sampling the sensor signal at a timing of the zero-cross point of the drive signal. FIG. 19A shows a sine wave signal $i_0$ cosωt from the oscillator 2. An envelop of the sensor signal shown in FIG. 19B is sampled at a time $t_z$ of a timing of the zero-cross point $Z_p$ of this sine wave signal $i_0$ cosωt. A sampling hold signal is obtained as shown in FIG. 19C. The sampling hold signal is a voltage signal (for example, defined as $V_A$). It is compared with a predetermined standard voltage (for example, defined as $V_R$), and the difference ΔV (for example, $\Delta V = V_{R-VA}$) is calculated. By multiplying it by a predetermined coefficient k, a changed amount Δi of the amplitude of the drive signal is calculated as shown in FIG. 19D. That is, the drive signal is $(i_0 + \Delta i)$ cosωt, from this changed amount Δi. In this case, the correction of the sensor voltage is a fixed condition when the drive current is 0. Thus, the correction is not needed, or a simply calculated correction is sufficient.

As a basic operation of the correction of the above mentioned sensor voltage, it is considered that the sensor voltage is always corrected corresponding to the current value of the drive signal in each of the phases. However, as a simpler method, the correction can be omitted by setting the zero-cross point of the drive signal to a sampling point of a sensor voltage envelop, as mentioned above. Further, as another method, the following method is considered. That is, a point is detected at which the current values of the drive signals in the respective phases (the sine wave drive signal and the cosine wave drive signal) are equal to each other, and the sensor voltage is sampled at this point.

Figure 20:
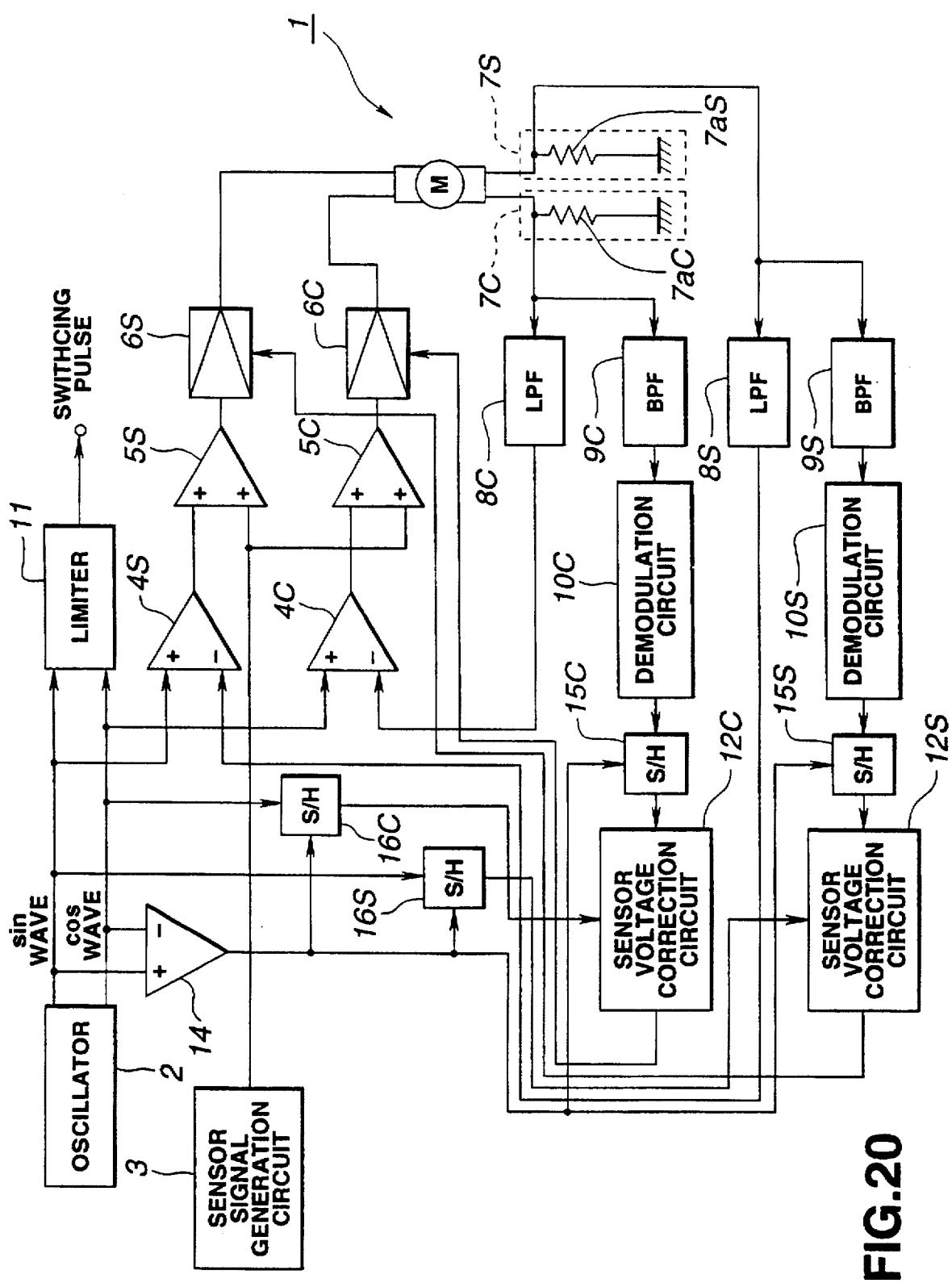
FIG. 20 is a block diagram showing a motor device as a seventh embodiment in accordance with the present invention.

FIGS. 20 and 21 are views explaining a method of sampling the sensor voltage at a point at which the current values of the drive signals in the respective phases are equal to each other as mentioned above.

FIG. 20 is a block diagram showing a schematic configuration of a motor device as a seventh embodiment according to the present invention. In FIG. 20, the sine wave drive signal and the cosine wave drive signal are sent from the oscillator 2 to a comparator 14. FIG. 21 is a view explaining an operation of the comparator 14. As for a sine wave drive signal a shown in FIG. 21A and a cosine wave drive signal b shown in FIG. 21B, a timing when current values of the drive signals a and b in these respective phases are coincident with each other, that is, a time $t_c$ when they have the same values c is detected, and then sampling pulse is outputted. This sampling pulse from the comparator 14 is sent to sample/hold (S/H) circuits 15S, 15C, 16S and 16C, respectively.

The sample/hold (S/H) circuit 15S samples and holds an envelop of a sensor signal from a demodulator 10S and sends to a sensor voltage correction circuit 12S. The sample/hold (S/H) circuit 15C samples and holds an envelop from a sensor signal from a demodulator 10C and sends to a sensor voltage correction circuit 12C. The sample/hold (S/H) circuit 16S samples and holds a sine wave drive signal from the oscillator 2, sends to the sensor voltage correction circuit 12S, and controls a correction amount. A signal from the sensor voltage correction circuit 12S is sent to a gain control terminal of an amplifier 6S. The sample/hold (S/H) circuit 16C samples and holds a cosine wave drive signal from the oscillator 2, sends to the sensor voltage correction circuit 12C, and controls a correction amount. A signal from the sensor voltage correction circuit 12C is sent to a gain control terminal of an amplifier 6S. The other configuration is similar to those of FIGS. 1 and FIGS. 17. Identical reference numerals are given to the corresponding portions, and then the explanation is omitted.

According to the seventh embodiment of the present invention, the drive current values in the respective phases are equal to c, for example, and thereby it is possible to easily carry out a sensor current correction by means of the same current value, and since sampling timings are the same, errors due to the jitter are also few. Further, it is possible to use such an area that the drive currents in the respective phases are not 0 and a sensor sensibility is high (an area where the change of the magnetic permeability μ is large). Thus, a sensor output is obtained sufficiently, a S/N ratio is excellent, and the servo condition is stable.

When the servo condition of the motor is disordered due to a disturbance and the like, in order to quickly recover when its cause is solved, it is desirable to set the drive currents in the respective phases to 0, send only the sensor signals to the coils of the motor, detect the phase angle of the rotation at the disordered time and add the drive currents in synchronization with speed phases thereof. In a case of the servo motor or the like, at a time of a servo confusion, the motor is stopped immediately. However, in a case of a spindle motor or the like, even when a lock is disordered, it is necessary to recover while the rotation is continued. The above mentioned method is effective even in this case.

A rotation direction detection of a motor will be explained hereafter.

In a case of a motor having a construction equal to or more than three phases, it is possible to detect a rotation direction. However, in a case of a motor having a two-phase construction, it is not possible to basically detect the rotation direction. The reason is that the sensor signals obtained from the respective phases are out of phase by 180 degrees from each other, and the phase difference is the same even if the rotation direction is changed. Then, it is considered to judge the motor rotation direction by adding offset signals to the drive signals, and detecting the phase difference between the sensor signals extracted from the motor drive signals when the offset signals are added.

FIG. 22 is a block diagram showing a main portion of a configuration to which the offset is added in order to detect a rotation direction in a motor having a two-phase construction. In FIG. 22, an offset pulse is generated, for example, by triggering an offset pulse generating circuit 18 at a predetermined timing by using a timer 17, and the offset pulses are sent to adders 19S and 19C. The sine wave drive signal is sent to the adder 19S from the oscillator 2, and the cosine wave drive signal is sent to the adder 19C from the oscillator 2, respectively. The offset pulses are added to these drive signals, and sent to the differential amplifiers 4S and 4C, respectively. The other configuration is similar to that of FIGS. 1, 17 or 20 and is not shown. The explanation is also omitted.

Here, in a case that the offset pulse is not applied, as shown in FIG. 23, a sensor signal is added to a sine wave drive signal in FIG. 23A, and sent to the motor coil. The sensor signal is added to the sensor signal detected as FIG. 23B and a cosine wave drive signal in FIG. 23C, and sent to the motor coil. The signal is out of phase by 180 degrees from the sensor signal detected as FIG. 23D. Thus, a phase relation is represented in the same state even if the rotation direction is changed. In contrast with this, as shown in FIG. 24, in a case that a predetermined offset d is added to the drive signal, the sensor signal in FIG. 24B detected for the drive signal in FIG. 24A is out of phase by 90 degrees from the sensor signal in FIG. 24D detected for the drive signal in FIG. 24C. Therefore, for example, when the motor is rotated in a normal direction, the phase difference is +90, and when the motor is rotated in a reverse direction, the phase difference is −90 (or+270). As a result, they can be distinguished.

FIG. 25 shows one example of a drive signal to which an offset obtained from the adder 19S (or from the adder 19C) in FIG. 22 is added. An offset pulse is added to a sine wave drive signal between times $t_1$ and $t_2$ and between times $t_3$ and $t_4$. It is allowable to add this offset pulse periodically or to add singly when desiring to obtain the rotation direction.

Incidentally, the present invention is not limited to the above mentioned embodiments. For example, in the explanations of the above mentioned respective embodiments, the appropriate rotation position detecting device is applied to the brush-less motor 1. However, it is allowable to apply the device to a so-called brush motor. Otherwise, of course, various modifications and adaptations may be made, without departing from the technical spirit and range according to the present invention.

The rotation position detecting device in accordance with the present invention can provide a perfectly new sensor-less driving method and can detect a rotation position accurately and surely at a time of starting a motor or even in a case of a slow speed rotation. Further, since the rotation position can be detected accurately and surely, a motor can be used for a servo control without mounting a rotation detection element. As a result, it is possible to make a motor smaller and a cost thereof cheaper by reducing the part number and making a mounted area smaller.

Further, a motor device in accordance with the present invention can carry out a rotation and drive in synchronization with reference, without basically modifying inner construction for all brush-less motors, since using a sensor-less method which perfectly solves defects of a back electromotive voltage method.

What is claimed is:

1. A rotation position detecting device, characterized in that said rotation position detecting device comprises;

a periodic signal outputting means for outputting periodic signals which are out of phase by a predetermined angle from each other to respective phases of a motor having a plurality of phases;

a sensor signal outputting means for outputting a sensor signal having a higher frequency than that of said periodic signal;

an adding means for adding the sensor signal from said sensor signal outputting means to the periodic signal from said periodic signal outputting means and inputting the added signal to each of the phases of said motor as a motor drive signal;

a rotation position detecting means for detecting the motor drive signal input to each of said phases and extracting each of the sensor signals from each of the motor drive signals, and outputting each of the extracted sensor signals a rotation position detecting signal indicating a rotation position of said motor wherein said rotation position detecting means further includes a memory means for storing a value of the periodic signal when jitter component of a load of said motor or information corresponding to jitter component becomes minimum as an optimum drive pattern for said motor; and a controlling means for rotating and driving said motor based on said optimum drive pattern stored in said memory means.

2. A rotation position detecting device according to claim 1, characterized in that said periodic signal is a constant current sine wave drive signal.

3. A rotation position detecting device according to claim 2, characterized in that said rotation position detecting device further comprises a standard position detection signal outputting means for determining a standard position of said motor based on a level of said rotation position detection signal obtained relative to a pole number of said motor while said motor is rotated one turn, and for outputting a standard position detection signal at this determined timing.

4. A rotation position detecting device according to claim 2, characterized in that said rotation position detecting device further comprises a resolver/digital converter for digitizing and outputting each of the sensor signals from said rotation position detecting means, based on the sensor signal from said sensor signal outputting means.

5. A rotation position detecting device according to claim 2, characterized that said rotation position detecting device detects a zero-cross point of said motor drive signal input to said motor, samples the sensor signal extracted from said motor drive signal at this zero-cross detection timing and detects the rotation position.

6. A rotation position detecting device according to claim 2, characterized in that said rotation position detecting device corrects the voltage of the sensor signal extracted from said motor drive signal based on the sine wave signal from said sine wave signal outputting means.

7. A rotation position detecting device according to claim 6, characterized in that said rotation position detecting device detects a point at which current values in the respective phases of said motor are equal to each other, samples the sensor signal extracted from said motor drive signal at this detected point and corrects the sampled value based on the sine wave signal from said sine wave signal outputting means.

8. A rotation position detecting device according to claim 2, characterized in that said rotation position detecting device sets the sine wave signal from said sine wave signal outputting means to zero when a servo condition of said motor is disordered, and outputs only the sensor signal from said sensor signal outputting means as said motor drive signal to each of the phases of said motor.

9. A rotation position detecting device according to claim 2, characterized in that said rotation position detecting device adds an offset signal to said motor drive signal transiently, detects a phase difference between the sensor signal extracted from said motor drive signal when this offset signal is added, and thereby judges a motor rotation direction.

10. A motor device characterized in that said motor device comprises:

- a sine wave signal outputting means for outputting sine wave signals which are out of phase by a predetermined angle from each other to respective phases of a motor having a plurality of phases;
- a sensor signal outputting means for outputting a sensor signal having a higher frequency than that of said sine wave signal;
- an adding means for adding the sensor signal from said sensor signal outputting means to the sine wave signal from said sine wave signal outputting means and inputting the added signal to each of the phases of said motor as a motor drive signal;
- a rotation position detecting means for detecting the motor drive signal input to each of said phases and extracting each of the sensor signals from each of the motor drive signals, and outputting each of the extracted sensor signals a rotation position detecting signal indicating a rotation position of said motor wherein said rotation position detecting means further includes a memory means for storing a value of the periodic signal when jitter component of a load of said motor or information corresponding to jitter component becomes minimum as an optimum drive pattern for said motor;
- a controlling means for rotating and driving said motor based on said optimum drive pattern stored in said memory means; and
- a means for carrying out a rotation phase control of said motor corresponding to the rotation position detection signal from said rotation position detecting means.

11. A motor device according to claim 10, characterized in that said sine wave signal is a constant current drive signal.

12. A motor device according to claim 11, characterized in that said motor device further comprises a standard position detection signal outputting means for determining a standard position of said motor based on a level of said rotation position detection signal obtained relative to a pole number of said motor while said motor is rotated one turn, and for outputting a standard position detection signal at this determined timing.

13. A motor device according to claim 11, characterized in that said motor device further comprises a resolver/digital converter for digitizing and outputting each of the sensor signals from said rotation position detecting means, based on the sensor signal from said sensor signal outputting means.

14. A motor device according to claim 11, characterized that said motor device detects a zero-cross point of said motor drive signal input to said motor, samples the sensor signal extracted from said motor drive signal at this zero-cross detection timing and detects the rotation position.

15. A motor device according to claim 11, characterized in that said motor device corrects the voltage of the sensor signal extracted from said motor drive signal based on the sine wave signal from said sine wave signal outputting means.

16. A motor device according to claim 15, characterized in that said motor device detects a point at which current values in the respective phases of said motor are equal to each other, samples the sensor signal extracted from said motor drive signal at this detected point and corrects the sampled value based on the sine wave signal from said sine wave signal outputting means.

17. A motor device according to claim 11, characterized in that said motor sets the sine wave signal from said sine wave signal outputting means to zero when a servo condition of said motor is disordered, and outputs only the sensor signal from said sensor signal outputting means as said motor drive signal to each of the phases of said motor.

18. A motor device according to claim 11, characterized in that said motor adds an offset signal to said motor drive signal transiently, detects a phase difference between the sensor signal extracted from said motor drive signal when this offset signal is added, and thereby judges a motor rotation direction.

* * * * *